(12) United States Patent
Vantalon et al.

(10) Patent No.: US 8,291,236 B2
(45) Date of Patent: Oct. 16, 2012

(54) METHODS AND APPARATUSES FOR SECONDARY CONDITIONAL ACCESS SERVER

(75) Inventors: Luc Vantalon, Sunnyvale, CA (US); Paolo Siccardo, Los Altos, CA (US)

(73) Assignee: Digital Keystone, Inc., Mountain View, CA (US)

( * ) Notice: Subject to any disclaimer, the term of this patent is extended or adjusted under 35 U.S.C. 154(b) by 2005 days.

(21) Appl. No.: 11/007,116

(22) Filed: Dec. 7, 2004

(65) Prior Publication Data

US 2006/0123246 A1    Jun. 8, 2006

(51) Int. Cl.
*H04L 29/06* (2006.01)
(52) U.S. Cl. ............... 713/189; 713/153; 726/2; 726/3; 726/27; 348/E5.004; 348/E7.06
(58) Field of Classification Search .................. 713/189; 726/2
See application file for complete search history.

(56) References Cited

U.S. PATENT DOCUMENTS

| | | | |
|---|---|---|---|
| 6,961,858 B2 * | 11/2005 | Fransdonk | 726/29 |
| 7,036,011 B2 * | 4/2006 | Grimes et al. | 713/156 |
| 7,127,619 B2 * | 10/2006 | Unger et al. | 713/193 |
| 7,152,160 B2 * | 12/2006 | Lantto et al. | 713/168 |
| 7,171,558 B1 * | 1/2007 | Mourad et al. | 713/168 |
| 7,171,588 B2 * | 1/2007 | Friedman et al. | 714/38.12 |
| 7,174,021 B2 * | 2/2007 | Krishnaswamy et al. | 380/277 |
| 7,177,429 B2 * | 2/2007 | Moskowitz et al. | 380/252 |
| 7,292,692 B2 * | 11/2007 | Bonan et al. | 380/212 |
| 7,296,154 B2 * | 11/2007 | Evans et al. | 713/169 |
| 7,302,058 B2 * | 11/2007 | Candelore | 380/200 |
| 7,316,032 B2 * | 1/2008 | Tayebi et al. | 705/51 |
| 7,325,140 B2 * | 1/2008 | Carley | 713/182 |
| 7,336,784 B2 * | 2/2008 | Zuili | 380/200 |
| 7,493,291 B2 * | 2/2009 | Simelius | 705/59 |

(Continued)

FOREIGN PATENT DOCUMENTS

EP      0 691 787 A1      1/1996

(Continued)

OTHER PUBLICATIONS

Kamperman, Frank. van Rijnsoever, Bart. Conditional Access System Interoperability Through Software Downloading. IEEE Transactions on Consumer Electronics. vol. 47. Issue: 1. Relevant pp. 47-54. Pub. Date: Feb. 2001. Found on The World Wide Web at: http://ieeexplore.ieee.org/stamp/stamp.jsp?tp=&arnumber=920419.*

InterTrust's Right/System Platform. InterTrust Technologies Corp. Conditional Access (CA) Tutorial. Digital TV Group. www.dtg.org.uk/reference/tutorial/ca.htm. Aug. 2004. 2 pages.

(Continued)

*Primary Examiner* — Nathan Flynn
*Assistant Examiner* — Jeremiah Avery
(74) *Attorney, Agent, or Firm* — Blakely, Sokoloff, Taylor & Zafman LLP

(57) ABSTRACT

Conditional access to media content of primary security systems on a secondary networked environment. In one embodiment, a conditional access server is used to provide services to secondary CA clients (e.g., a bridge, a renderer, a storage, or their different combinations) through network connections. Containing data representing the subscriber, a conditional access server recovers entitlement data and/or decryption keys of a primary security system for the conditional access protected content, such as service keys and control words, and/or enforces conditional access to the content by secondary CA clients according to the authorization of the primary security system for the secondary CA clients. In one embodiment, a conditional access system provides delayed authorization for use so that the content can be recorded for later use when authorized and broadcasts rights for use on multiple secondary CA clients.

146 Claims, 19 Drawing Sheets

U.S. PATENT DOCUMENTS

| | | | |
|---|---|---|---|
| 7,546,641 B2 | 6/2009 | Robert et al. | |
| 7,685,206 B1* | 3/2010 | Mathew et al. | 707/785 |
| 7,757,299 B2 | 7/2010 | Robert et al. | |
| 2003/0196092 A1 | 10/2003 | Raley et al. | |
| 2004/0196842 A1* | 10/2004 | Dobbins | 370/389 |
| 2005/0021539 A1* | 1/2005 | Short et al. | 707/100 |

FOREIGN PATENT DOCUMENTS

| | | |
|---|---|---|
| EP | 0 858 184 A2 | 8/1998 |
| FR | 2 843 257 A1 | 2/2004 |
| WO | WO 00/56068 A1 | 9/2000 |
| WO | WO 03/010722 A2 | 2/2003 |

OTHER PUBLICATIONS

Renato Iannella. "Digital Rights Management (DRM) Architectures". D-Lib Magazine, Jun. 2001. vol. 7, No. 6. ISSN 1082-9873. pp. 1-10.

Mark Massel. "Conditional Access". Broadcasting Engineering, Oct. 2001.

ATSC Standard: Conditional Access System for Terrestrial Broadcast, Revision A. Advanced Television Systems Committee, Jul. 2004. pp. 1-31.

Van Moffaert, A., et al., "Digital Rights Management: DRM is a key enabler for the future growth of the broadband access market, and the telecom/networking market in general." *Alcatel Telecommunications Review*, Alcatel, Paris Cedex, FR, Apr. 2003 (2003-2004), XP007005930 ISSN: 1267-7167, pp. 1-7.

International Search Report and Written Opinion of the International Searching Authority for PCT/US2005/039794, mailed Apr. 3, 2006, 11 pages.

PCT Notification Concerning Transmittal of International Preliminary report on Patentability, Date Jun. 21, 2007, 7 Pages.

* cited by examiner

METHODS AND APPARATUSES FOR SECONDARY CONDITIONAL ACCESS SERVER

FIELD OF THE TECHNOLOGY

The invention relates to conditional access (CA) for systems such as a digital cable television system, a satellite television system, etc.

BACKGROUND

Conditional access (CA) is a technique for limiting the access of content (e.g., audiovisual works such as movies) to authorized users. For example, CA systems have been developed for cable TV and non-cable TV including digital television (DTV). In a CA system for digital television, the media content is scrambled (encrypted) using a standard algorithm before broadcasting. The key used for scrambling/descrambling the media content in a CA system is called a control word (CW). The control word is securely provided to the subscribers through entitlement control messages and entitlement management messages. A security device uses the control word to descramble (decrypt) the received media content.

Typically, the control word changes frequently (e.g., about every 0.1 second). To prevent unauthorized access, the control words are protected (scrambled/encrypted) using a service key (SK) when being broadcast. Only the security devices in possession of the service key can recover the control word for descrambling the media content protected by the CA system.

An entitlement control message (ECM) is typically used to broadcast the control word in an encrypted form, which can be decrypted using the service key. The entitlement control message is checked against the access criteria in order to provide authorization. The control word is released if authorization is granted. Using the service key, the system can securely broadcast common information, such as the control word, to subscribers simultaneously without having to individually broadcast a message for each of the subscribers.

To individually manage each security device, each security device has a unique identity so that the CA system can broadcast a message specifically for one security device. An entitlement management message (EMM) typically contains the actual authorization data (e.g., entitlement) to authorize the security device for certain access criteria. Entitlement management messages are individually addressed to particular security devices. An entitlement management message may be only for one particular security device with a unique identity. The system broadcasts an entitlement management message for each of the entire population of the security devices to individually control the security devices. Typically, each security device has a unique, secret user key (UK) so that an entitlement management message for one security device can only be decrypted using the unique user key of the security device.

Typically, the service key also changes periodically (e.g., once a month for subscription TV or once a movie for Pay-per-View). An entitlement management message can be used to send the service key to a particular security device for a subscriber. The CA system broadcasts an entitlement management message for each subscribing security device to deliver the service key. After the service key is individually delivered to the subscribing security devices using the entitlement management messages, the CA system can broadcast the encrypted control words that can be decrypted using the service key.

Through the use of entitlement management messages and entitlement control messages, a CA system can offer capabilities such as pay-per-view (PPV), interactive features such as video-on-demand (VOD) and games, the ability to restrict access to certain material, and the ability to direct messages to specific receiving devices (e.g., set-top boxes with a smart card).

In digital television, the media content (e.g., video and audio signals) is converted into a digital form using the MPEG-2 format. The digital form of the media content of one program is multiplexed together with those of other programs for transmission so that multiple programs appear to be transmitted simultaneously. The CA system scrambles the digital form of programs and transmits the entitlement control messages and the entitlement management messages with the digital form of programs for broadcast either within the multiplex (e.g., Satellite) or through an out-of-band channel (e.g., Cable).

Typically, a set-top box (STB) at the receiving end descrambles the data stream and decodes the MPEG-2 data for viewing. A tuner portion of the STB receives the incoming signal, demodulates it and reconstitutes the transport stream, which contains many packets of information. The set-top box can de-multiplex the entitlement management messages and entitlement control messages and the media content. The data (e.g., service key and control word) contained in the entitlement management message and entitlement control message are used to descramble the encrypted programming material. The set-top box then renders the MPEG-2 data for viewing.

A digital rights management (DRM) system manages rights digitally. Digital rights management uses encryption software to protect electronic information and prevent widespread distribution. In a typical digital rights management scheme, a DRM server software program wraps the digital content through encryption according to applicable policies. A DRM client software program unwraps the content and makes it accessible in accordance with its rights. The rights are typically distributed to clients separately from the wrapped electronic information. DRM clients may include desktop PCs, handhold devices, set-top boxes, mobile phones and other portable devices. In additional to encrypting/scrambling the digital content to limit the distribution, a digital rights management system may also provide the description, identification, trading, protection, monitoring and tracking of various forms of rights.

Content encryption is typically performed using symmetric key cryptography, while key encryption is typically using public/private key cryptography. In symmetric key cryptography, the same key is used to both encrypt and decrypt the content. In public/private key cryptography, different but related keys are used to encrypt and decrypt the content.

SUMMARY OF THE DESCRIPTION

Methods and apparatuses for bridging two security systems so that a primary security system can control premium content distribution to external devices secured by a secondary security system. Some embodiments of the present invention are summarized in this section.

In one embodiment of the present invention, the primary security system is a broadcast CA system, used to secure the distribution of premium content only to legitimate subscribers; and the secondary security system includes a digital rights management system used to secure the distribution of premium content only to the legitimate devices of the subscriber.

In one embodiment of the present invention, the primary security system is a broadcast CA system, used to secure the distribution of premium content only to legitimate local broadcasters; and the secondary security system includes another broadcast CA system, used to secure the re-distribution of premium content only to the legitimate local subscribers.

In one embodiment of the present invention, the primary security system is a digital rights management system, used to secure the distribution of premium content only to legitimate devices of the subscriber; and the secondary security system is another digital rights management system, used to secure the further distribution of premium content only to other devices of the subscribers not supporting the primary digital rights management system.

In at least some embodiments of the present invention, a primary CA server provides entitlement data and/or decryption keys to multiple primary CA clients, along with some encrypted premium content. A secondary CA server acts as a legitimate primary CA client; the secondary CA server tries to recover the protected content and to provide with the protected content a new set of entitlement data and/or decryption keys consistent with the original entitlements to one or more secondary CA clients.

In one embodiment of the present invention, the secondary CA server may completely remove the primary security system encryption before processing it for distribution to the secondary CA clients; or may keep some or the totality of the primary security system encryption, still hand over it to the secondary CA client but add provision to the content so that it can be further authorized at playback time.

In one embodiment of the present invention, the primary CA server may enable the secondary CA server to first distribute protected but non-authorized content to secondary CA clients and then authorize it later.

In one aspect of the present invention, a method to control a presentation of content, includes: receiving a representation of content from a first CA server which provides the content in an encrypted form and uses a first set of cryptographic keys to protect the content from unauthorized access; and presenting the content, at a user's request, through a second CA server which is coupled to the first CA server. The presenting of the content is authorized through a client server relationship between the second and the first CA servers respectively. The second CA server uses a second set of cryptographic keys to protect the content from unauthorized access in presenting the content. In one example, the content is presented by a network client of the second CA server using the second set of cryptographic keys; and the first CA server provides the second CA server the first set of cryptographic keys for authorized use. In one example of an embodiment, the second CA server authorizes the network client to use the content through the digital rights management system in accordance with authorization to use received from the first CA server. In one example, the second CA server translates authorization to access the content from authorization received from the first CA server to authorization for the network client. In one example of an embodiment, the secondary CA server acts as a primary CA server to another CA server. In one example of an embodiment, the first CA server provides authorization to the second CA server according to an identity of the second CA server; the second CA server provides authorization to the client according to an identity of the client; and the first CA server is not aware of an identity of the client.

One aspect of the present invention includes a method for the secondary CA server to distribute protected but non-authorized content to secondary CA clients; and to enable the same clients to play back the content when later authorized by the primary CA server.

One aspect of the present invention includes a method for a secondary CA server to process entitlement management messages from a primary CA server and to transmit to secondary CA clients through a network connection access controlled data that is in an access controlled format and that is at least partially derived from the entitlement management messages. In one example of an embodiment, the secondary CA server has a user key representing a subscriber of the primary security system; and processing the entitlement management messages includes: decrypting an entitlement management message to obtain a service key of the primary security system.

In one example of an embodiment, the method further includes: receiving, at the secondary CA server, an entitlement control message of the primary security system; and processing the entitlement control message to obtain a control word of the primary security system; where the access controlled data includes the control word. In one example, the access controlled data comprises a decrypted version of the entitlement control message.

In one example of an embodiment, the method further includes: receiving, at the secondary CA server, an entitlement control message of the primary security system; and processing the entitlement control message on the secondary CA server to generate a substitutive entitlement control message as a replacement of the entitlement control message; where the access controlled data includes the substitutive entitlement control message. In one example, the substitutive entitlement control message has a control word encrypted using a key of the secondary CA server. In one example, the substitutive entitlement control message is to be decrypted using a user key of the primary security system. In one example, the entitlement control message and the substitutive entitlement control message have a same control word. In another example, the entitlement control message has a first control word; the substitutive entitlement control message has a second control word; and the first and second control words are different. In one example, the access controlled data further includes the first and second control words.

In one example of an embodiment, the method further includes: receiving, at the secondary CA server, a first entitlement control message containing a first control word and content scrambled by the first control word; generating a second entitlement control message containing a second control word that is different from the first control word; and descrambling the content using the first control word and rescrambling the content by the second control word; where the access controlled data comprises the content rescrambled by the second control word and second entitlement control message. In one example, the method further includes: storing, at the secondary CA server, the content rescrambled by the second control word; and retrieving the content rescrambled by the second control word in response to a request from the secondary CA clients.

In another aspect of the present invention, a method to process media content provided by a primary security system, includes: receiving, at a secondary CA client from a secondary CA server through a network connection, access controlled data that is in an access controlled format and that is at least partially derived from entitlement management messages of the primary security system. In one example of an embodiment, the secondary CA client does not have a user key representing a subscriber of the primary security system.

In one example of an embodiment, the access controlled format protects access to data using a digital rights management system.

In one example, the method further includes: automatically determining whether or not to descramble a portion of media content received from the primary security system for recording according to the entitlement data; descrambling and recording the portion of the media content in response to a determination to descramble; and recording the portion of the media content without descrambling in response to a determination not to descramble.

In one example of an embodiment, the method further includes: sending, from the client of the secondary conditional server to the secondary CA server through a network connection, an entitlement control message, the entitlement control message containing a control word in an encrypted form; where the access controlled data comprises the control word. In one example, the method further includes: descrambling media content using the control word; and storing the media content in a storage under protection of a secondary security system. In another example, the method further includes: descrambling media content using the control word; and rendering the media content for presentation. In one example, the entitlement control message is retrieved from a storage device; the entitlement control message is controlled by a first entitlement management message for a first time period, which is earlier than a second entitlement management message for a second time period including a time between when the entitlement control message is sent from the secondary CA client to the secondary conditional server and when the access controlled data is received at the secondary CA client. In one example, the access controlled data includes a decrypted version of the entitlement control message.

In one example of an embodiment, the access controlled data includes a result of descrambling media content scrambled by the primary security system.

In one example of an embodiment, the method further includes: receiving a first entitlement control message for descrambling a portion of media content received from the primary security system; and sending the first entitlement control message from the secondary CA client to the secondary CA server through a network connection. The access controlled data comprises a second entitlement control message as a replacement of the entitlement control message; and the second entitlement control message is stored with the portion of the media content. In one example, both the first and the second entitlement control messages contain a same control word; the second entitlement control message is encrypted for decryption using a key of the secondary CA server. In another example, the first entitlement control message contains a first control word; the second entitlement control message contains a second control word; the first and second control words are different; the access controlled data further comprises the first and second control words; and the method further includes: descrambling the content using the first control word and rescrambling the content using the second control word.

The present invention includes methods and apparatuses which perform these methods, including data processing systems which perform these methods, and computer readable media which when executed on data processing systems cause the systems to perform these methods.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

DETAILED DESCRIPTION

The following description and drawings are illustrative of the invention and are not to be construed as limiting the invention. Numerous specific details are described to provide a thorough understanding of the present invention. However, in certain instances, well known or conventional details are not described in order to avoid obscuring the description of the present invention. References to one or an embodiment in the present disclosure are not necessarily references to the same embodiment; and, such references mean at least one.

Figure 2A:
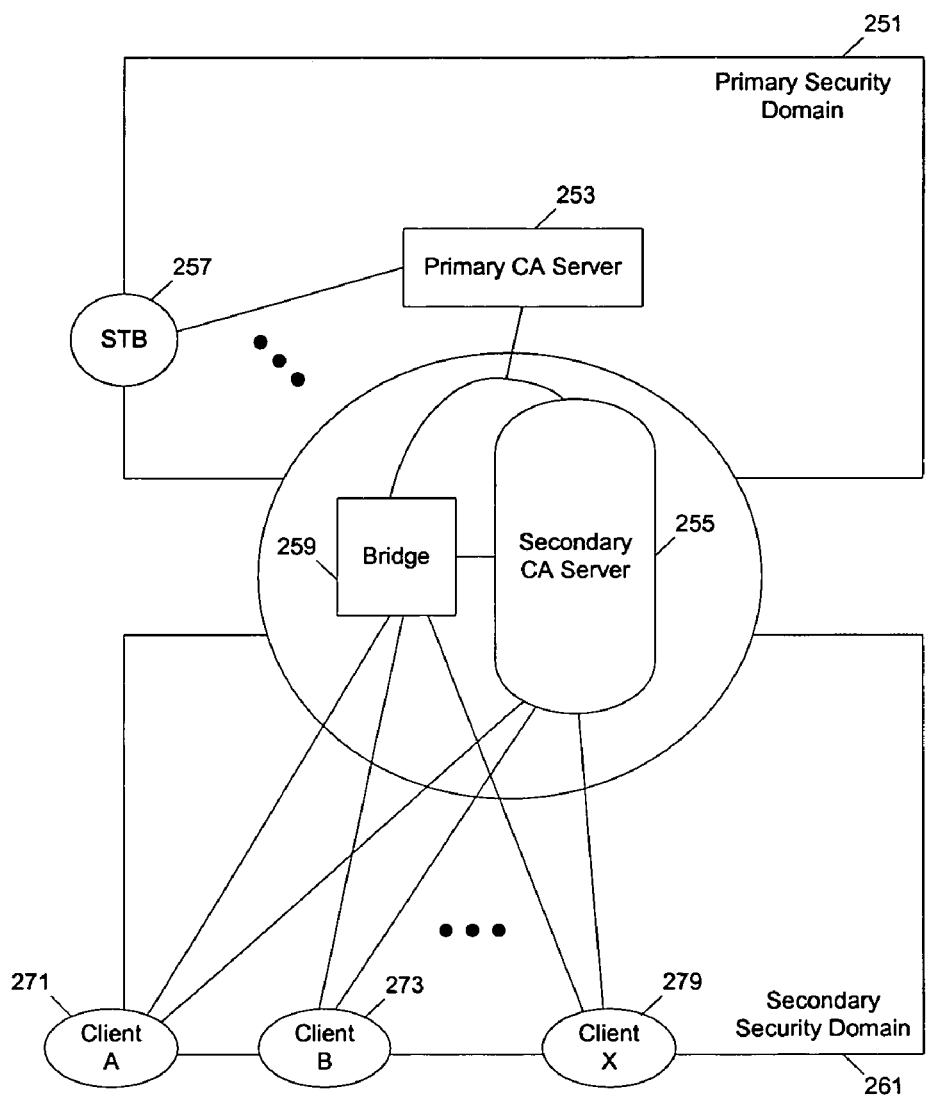
FIGS. 2A and 2B shows a primary security system bridged to a secondary security system according to one embodiment of the present invention.

FIG. 2A shows a primary security system bridged to a secondary security system according to one embodiment of the present invention. In FIG. 2A, the primary CA server (253) controls the access to the content in the primary security domain (251). The primary security domain (251) is typically a broadcast CA system. The primary CA server (253) transmits entitlement management messages and entitlement control messages so that only authorized clients, such as a subscriber's set top box (e.g., 257) can access (decrypt) the CA protected content.

In one embodiment of the present invention, a secondary CA server (255) bridges the primary security domain (251) and the secondary security domain (261). The secondary security domain typically includes a set of secondary CA clients (e.g., 271, 273, . . . , 279). The bridge (259) typically passes CA protected content from the primary security domain (251) to the secondary security domain (261) so that the secondary CA clients (e.g., 271, 273, . . . , 279) in the secondary security domain (261) may access the content secured in the secondary security domain under the control of the secondary CA server (255) in accordance with security messages provided by the primary security domain (251) to the secondary CA server (255). The secondary CA clients (e.g., 271, 273, . . . , 279) rely on the secondary CA server (255) to obtain the content. The secondary CA server (255) is partially in the primary security domain (251), since the secondary CA server is capable of processing the control information for conditional access provided by the primary CA server (253). The secondary CA server (255) acts as a client of the primary security domain (251) and as a control information provider of the secondary security domain (261). According to the access terms and conditions given by the primary CA server (253), the secondary CA server (255) conditionally allows the secondary CA clients (e.g., 271, 273, . . . , 279) to access the content.

For example, in FIG. 2A, the bridge 259 may hand over the scrambled (encrypted) content to the secondary CA clients. To descramble (decrypt) the content, the secondary CA clients request information from the secondary CA server (255). For example, in one embodiment, the secondary CA server (255) provides control words for descrambling the content to the authorized secondary CA clients. The control words are provided under the protection of a DRM system in the secondary security domain (261). The secondary security domain can include another CA server (not shown). In FIG. 2A, the bridge (259) may also be partially or completely combined within the secondary CA server (255) as a single physical component of a distributed system.

Note that in FIG. 2A, a bridge and a further secondary CA server can be used to extend from the secondary domain (261) into another domain. For example, the client (279) can be replaced with a bridge and a further secondary CA server in a way similar to the bridge (259) and secondary CA server (255) replacing a set top box. Such an approach can be used recursively to form a chain of security domains bridged through the use of a hierarchy of cascaded secondary CA servers.

In one embodiment of the present invention, the secondary security domain is for a localized network, such as a network within a home or hotel or other domain. Alternatively, the secondary security domain may include Internet.

Figure 2B:
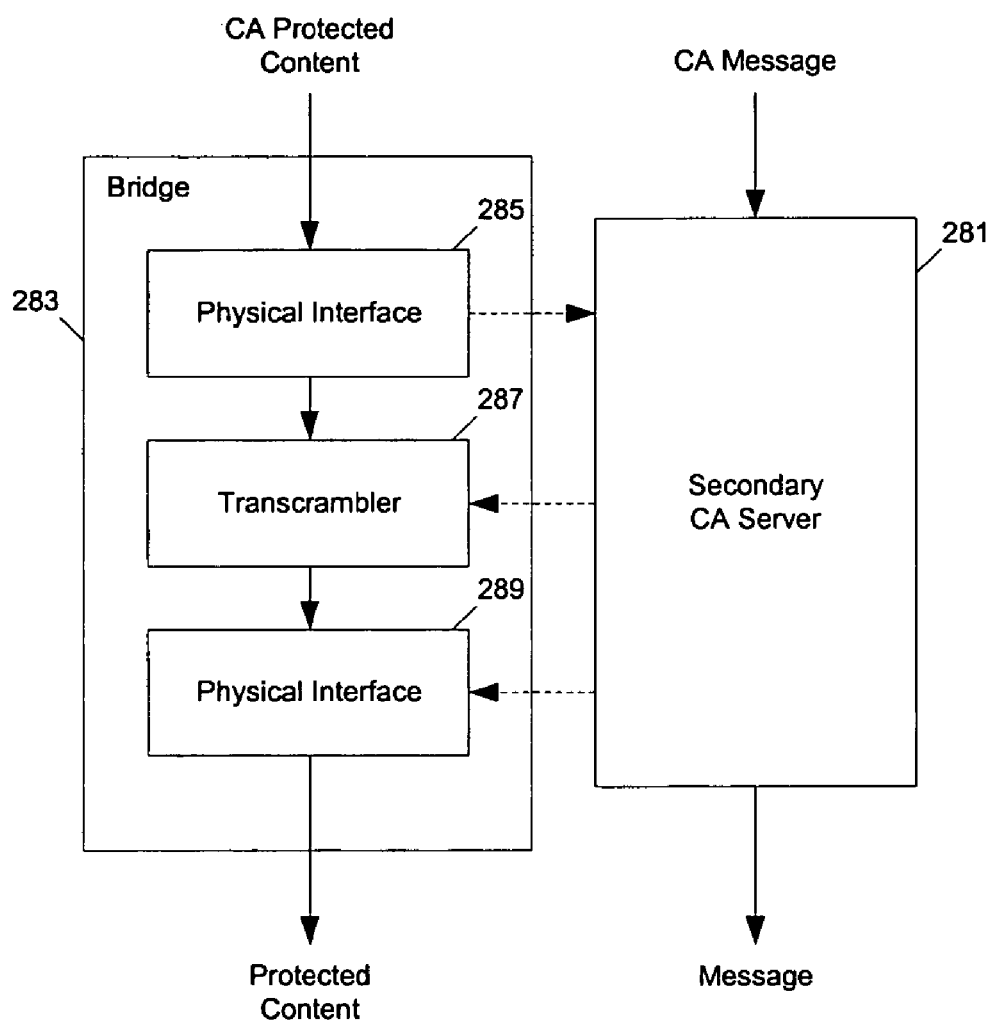

FIG. 2B illustrates a bridge (283) in relation with a secondary CA server (281). In FIG. 2B, the secondary CA server processes security messages, such as CA messages from the primary security domain. In one embodiment of the present invention, the secondary CA server translates authorization from the primary security domain into authorization in the secondary security domain. The secondary CA server generates security message for the secondary security domain in accordance with authorization obtained from security messages in the primary security domain. Thus, entities not known in the primary security domain can be provisioned through the use of the secondary CA server, which has an identity known in the primary security domain and knows the entities in the secondary security domain. In one embodiment, the secondary CA server follows rules (e.g., CA messages) of the primary CA server to manage a secondary subscriber management system (SMS) that is different from the primary subscriber management system managed by the primary CA server. In one embodiment, the client identities and authentication methods used by the secondary CA server in the secondary subscriber management system are independent from those used by the primary CA server in the primary subscriber management system. As a server in the secondary subscriber management system and a client in the primary subscriber management system, the secondary CA server bridges the two subscriber management systems. In one embodiment of the present invention, the CA servers support two different roots of trust for security. The secondary CA server and the primary. CA server supports root of trust independent from each other. In one embodiment, the root of trust is used to authenticate clients; the client authentication in the secondary security domain is completely independent from the client authentication in the primary security domain; and the authorization to use in the secondary security domain is in accordance with the authorization to use conveyed in the primary security domain.

In FIG. 2B, a number of components are illustrated for the bridge (283), such as a physical interface (285), a transcrambler (287) and another physical interface (289). For example, the physical interface (285) may be a tuner which converts the signals representing the CA protected content into a data format; the transcrambler (287) may convert the protected content from one protected (e.g., encrypted) format to another protected (e.g., encrypted) format; and the physical interface (289) may be a data network communication interface for transmitting the protected content to a client in the secondary security domain. The secondary CA server may receive information from the physical interface (285). The secondary CA server (281) may directly provide the content to the physical interface (289) in accordance with the authorization from the CA messages. The secondary CA server (281) may provide messages to control the operations of the transcrambler (287) and physical interface (289) in accordance with the authorization derived from the CA messages. In general, a bridge may include more or less components than those illustrated in FIG. 2B. For example, a bridge may have one or more of: as a tuner, a transcrambler, a transcoder, a physical interface, a network communication interface, a cable, a storage device, etc.

Figure 3:
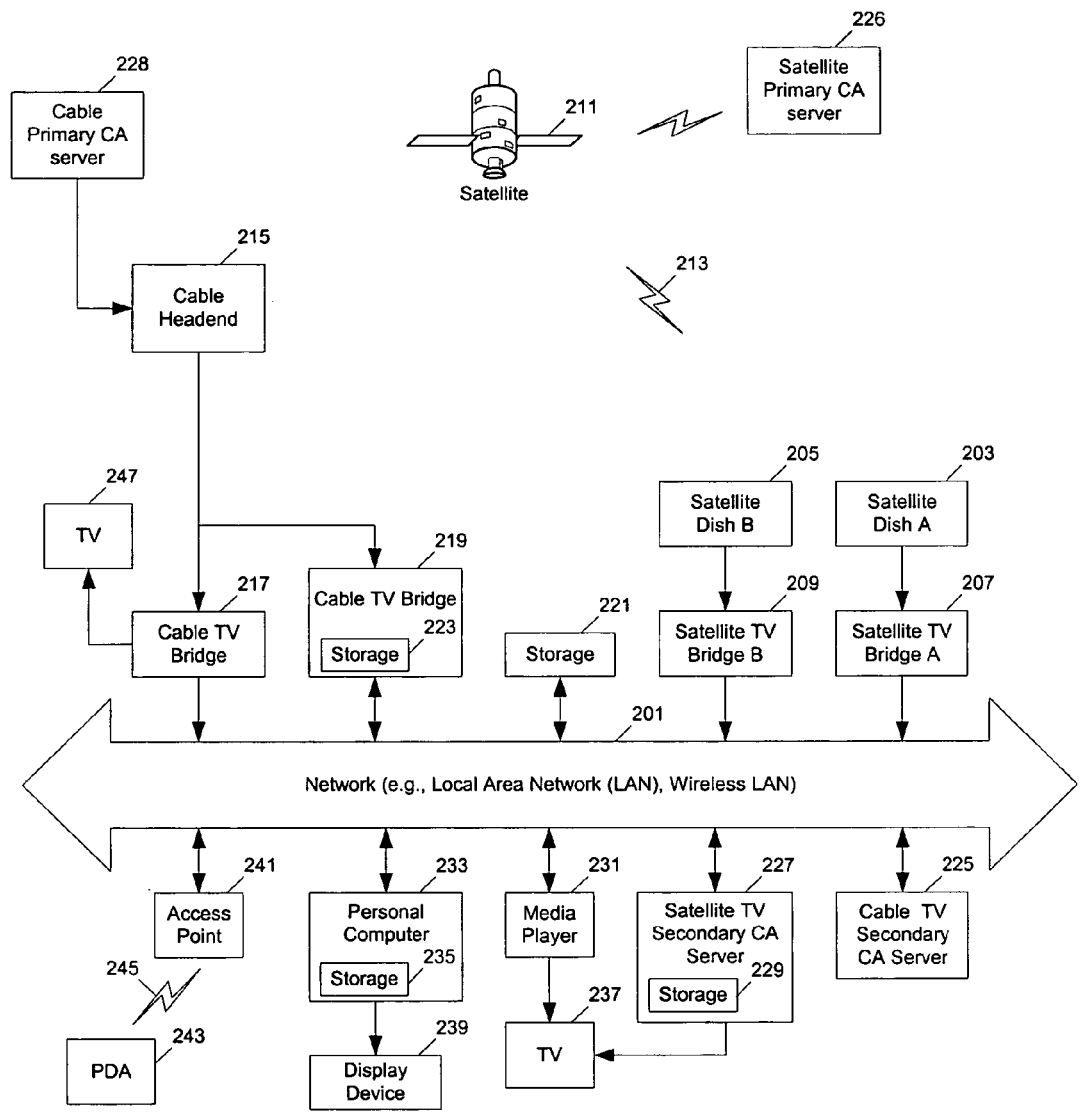
FIG. 3 illustrates a complex networked system with multiple primary security systems reaching multiple secondary security systems clients across a home network environment according to one embodiment of the present invention.

FIG. 3 illustrates a complex networked system with two primary security system sources (211 and 215) with their own primary CA servers (226 and 228), two secondary CA servers (227 and 225) and many secondary CA clients (207, 209, 217, 221, 231 and 233). In one embodiment of the present invention, a secondary CA server is used to provide services to a plurality of devices connected to a network (201), such as a local area network (LAN) or a wireless LAN. The network (201) may be partially a wired Ethernet in a home of a service subscriber with one or more wireless access points for mobile devices such as a personal data assistant (PDA), a palm computer, a notebook computer, or a cellular phone (e.g., connected to the network through a WiFi or Bluetooth connection). For example, in FIG. 3, the PDA (243) connects to the access point (241) through the wireless connection (245) and further to other components through the network (201). The network may also be a network for an organization or a commercial establishment (e.g., a hotel or a motel chain), such as an intranet or a virtual private network.

In FIG. 3, a cable TV secondary CA server (225) is used with the cable TV service. The cable primary CA server (228) couples with the cable headend (215) to provide the CA protected media content through the cable television transmission system to the cable TV bridges (e.g., 217 and 219) which may include cable TV tuners. The cable TV bridges receive the data packages and de-multiplex the entitlement management messages and entitlement control messages and the scrambled media content. Under the control and with the help of the cable TV secondary CA server (225), the media content can be secured on a storage (e.g., 221, 223 or 235) for access by various devices which can play back the media content, such as the personal computer (233) the media player (231), or the PDA (243). The personal computer (233) typically displays the video content on the display device (239), such as a Cathode Ray Tube (CRT) monitor or a flat Liquid-Crystal Display (LCD) panel. The media player (231) typically presents the media content on a television set (237). A media player may also be integrated with a television set to form a network-ready digital television set.

In one embodiment, the cable TV secondary CA server provides services to descramble/decrypt the cable TV broadcast. The decrypted/descrambled information is protected in a digital rights management system so that the media content from the broadcast of the cable TV system can be used in an authorized way. When authorized, the content can be recorded and played back at any time on any device convenient to the user in accordance with the rights of the subscriber. For example, with a subscription to only one simultaneous use, a user may choose to use cable TV bridge (217) to receive the broadcast and view the program on the TV (247), or use cable TV bridge (219) to record the program on the storage (223) for playing back at a different time using the PDA (243), the personal computer (233) or the media player (231).

In FIG. 3, a satellite TV secondary CA server (227) is used to provide services to both the satellite TV bridge A (207) and the satellite TV bridge B (209). The satellite TV secondary CA server (227) may store the protected media content on its storage (229) or on other storage devices on the network, such as the storage (235) of the personal computer (233) or the storage (221). Typically, a satellite (211) broadcasts (213) the protected media content to a geographical area. Separate satellite dishes (e.g., 203 and 205) are used for different satellite bridges (e.g., 207 and 209) respectively.

Traditionally, to access two different channels simultaneously, two set-top boxes are used. Satellite set-top boxes are independent from each other. The satellite broadcasts to the two set-top boxes as if the set-top boxes were for two different subscribers. In one embodiment of the present invention, the satellite TV secondary CA server provides services to both the satellite TV bridges. The satellite TV secondary CA server (227), not the satellite TV bridges (207 and 209), has the data representing the subscriber. Thus, one subscriber needs only one unique identification for the operation of multiple tuners.

In one embodiment, different secondary CA servers are used to extend the services of different primary CA servers, since different primary CA systems typically use entirely different algorithms and protocols for the entitlement management messages and entitlement control messages. In one embodiment of the present invention, the different secondary CA servers are physically in one data processing device with different software and smart cards for the processing of the messages of different CA systems. Further, a secondary CA server may be integrated with a bridge, a storage device, a renderer (e.g., PDA 243, personal computer 223, media player 231), or a combination of them. For example, the satellite TV secondary CA server may include a storage for recording media content, a bridge for interfacing with a satellite dish and a renderer for decoding the media content into standard video signals (for a television set and/or for a computer monitor).

Further details about various different arrangements of the components (e.g., secondary CA server, bridge, storage, renderer) and the operations of the components are provided below.

Figure 4:
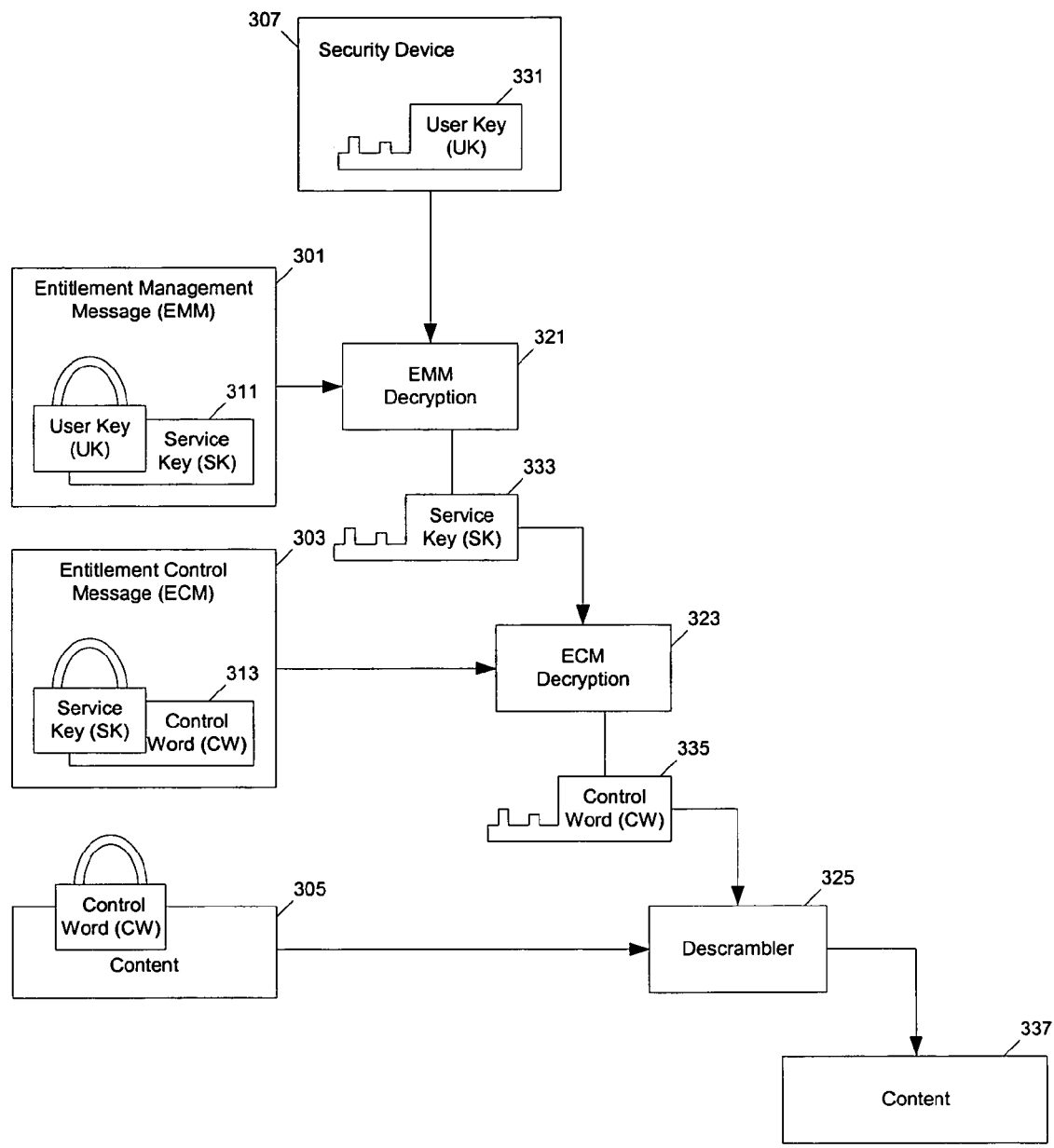
FIG. 4 illustrates a conditional access arrangement which may be used with the present invention.

FIG. 4 illustrates a conditional access arrangement which may be used with the present invention. In one embodiment of the present invention, a secondary CA server contains a security device (307) which has a unique user key (331) to represent the subscriber. The user key (331) can be used to decrypt the entitlement management message (EMM) (301), which has the encrypted service key (311). In one embodiment of the present invention, the secondary CA server performs the EMM decryption (321) for secondary CA clients using the user key (331) to recover the service key (SK) (333). The entitlement control message (ECM) (303) contains the encrypted control word (313). In one embodiment of the present invention, the secondary CA server further performs the ECM decryption (323) using the service key (333) to recover the control word (CW) (335) for the secondary CA clients. The scrambled content (305) can be descrambled using the control word (335) to generate the content (337). In one embodiment, the secondary CA server provides the control word to an authorized secondary CA client to descramble the content (305). Alternatively, the secondary CA server may further include a descrambler (325) to descramble the content for secondary CA clients.

The descrambler of a digital television system uses a standard algorithm (e.g., Common Scrambling for DVB, DES for Advanced Television Systems Committee (ATSC) standard (Conditional Access System for Terrestrial Broadcast)). The descrambler (325) can be conveniently located on any of the components (e.g., a bridge, a renderer or a storage).

In one embodiment of the present invention, a secondary CA server performs ECM decryption (323) and then generates a replacement entitlement control message. The replacement entitlement control is encrypted for decryption using a different service key, which is under the control of the secondary CA server, so that the secondary CA server does not need to maintain the service key (333) for recorded contents. The replacement entitlement control can be recorded with the scrambled content (305) protected by the DRM system for later use.

In one embodiment of the present invention, the control word is further changed for recording. After the descrambler (325) generates the clear content (337), the clear content is re-scrambled using a different control word for recording. For the recorded content, the CA protection may be translated so that the control word may change in-frequently (e.g., one control word for one entire movie).

Typically, a secondary CA server performs both EMM decryption (321) and ECM decryption (323) for all the secondary CA clients (e.g., a bridge, a renderer or a storage), since both the ECM and EMM are specific to a particular CA system.

In one embodiment of the present invention, the results of a secondary CA server are protected using a DRM system; and the DRM system manages the rights according to the data in the EMM (and/or ECM).

Although FIG. 4 shows a particular encryption/decryption arrangement of a CA system, it is understood that different arrangements can also be used with the present invention. For example, in a CA system, the service key may be delivered physically instead of through broadcasting. In general, the entitlement management messages are broadcast to individual devices to individually authorize entitlement; and the entitlement control messages are typically broadcast to all devices to provide the common key for descrambling the broadcast stream. It is understood that a service key represents the entitlement recovered from the entitlement management message; and the control word represents the key recovered from the entitlement control message for descrambling the media content.

Figure 5:
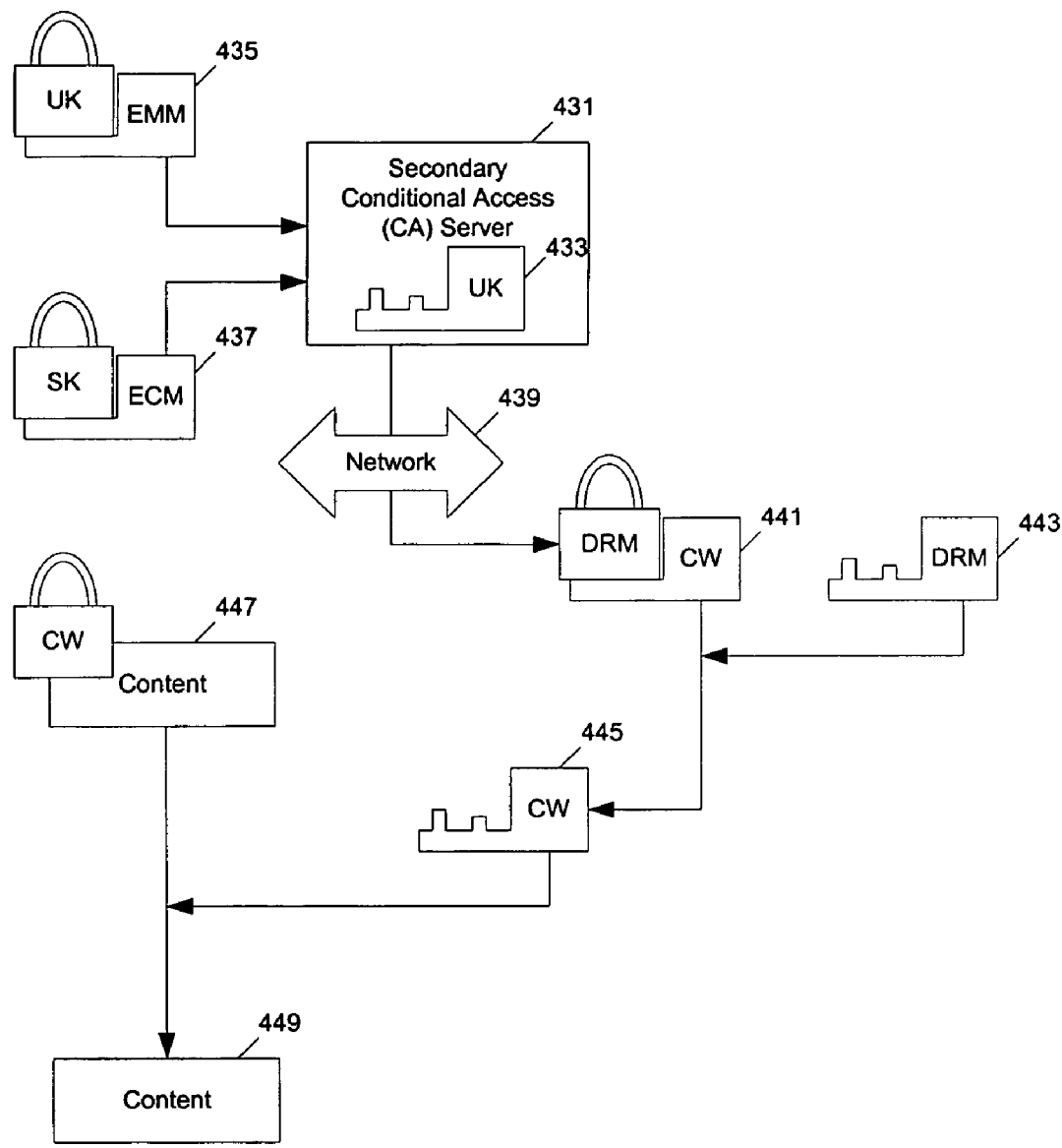
FIG. 5 illustrates a system having a secondary CA server for providing control words to secondary CA clients according to one embodiment of the present invention.

FIG. 5 illustrates a system having a secondary CA server for providing control words to secondary CA clients according to one embodiment of the present invention. In FIG. 5, the secondary CA server (431) uses its user key (UK 433) to recover the control word from the encrypted entitlement management message (EMM 435) and entitlement control message (ECM 437) for the secondary CA clients over the network (439). The recovered control word (441) is protected using a DRM system; and only a secondary CA client with appropriate rights (443) can use the control word (445) to descramble the content (447) to obtain the clear content (449) that is not encrypted/scrambled.

The rights to the control word can be determined from the data in the EMM at the time of recording and/or at the time of playback. The control word can also be provided to the secondary CA clients in real time as the broadcast is received for immediate viewing.

Since the control word is provided through the network (439) which may cause unpredictable network communication delay, arrangement is made to synchronize the control word with the decoding of the media content. In one embodiment, the secondary CA client synchronizes the control word obtained from the server with the stream of media content for descrambling operation. In one embodiment of the present invention, a secondary CA client for playing back the media content buffers a time period worth of content in a pipeline for playback in anticipation of unpredictable network delay in obtaining the control word, which changes frequently (e.g., every 0.1 second). When a control word is delay, the descrambled content in the pipeline decreases and the scrambled content in the pipeline increases; when the control word is received, the descrambling operation resumes to increase the descrambled content in the pipeline and decrease the scrambled content in the pipeline. Thus, the buffering allows the secondary CA client to maintain a constant fate of descrambled content for rendering in real time.

In one embodiment of the present invention, a secondary CA server further includes a descrambler so that the secondary CA clients do not need a descrambler.

In one embodiment of the present invention, the secondary CA server (431) uses both the data in the EMM received prior to the content reception and the data in the EMM received prior to the content consumption, if different, to determine the rights of the user for the service key. For example, in one embodiment of the present invention, when the user is entitled to the content at the time of recording, the service key can be recovered for the data in the EMM at the time of recording. When the recorded content is retrieved from the storage for playback, the secondary CA server may further determine the rights according to the data in the EMM for the current time period. In one embodiment, for example, the user is entitled to view the recorded content only if the user is currently a valid subscriber of the service (e.g., subscribing for the viewing of recorded contents). Alternatively, the secondary CA server uses only the data in the EMM at the time of recording to determine the rights to the recorded contents.

In one embodiment of the present invention, a primary CA server provides entitlement only at playback time. For example, the system can allow the user to record programs that the user is not entitled to use at the time of recording. After the user obtains the required rights (e.g., through purchase for pay-per-view, or upgrading a subscription package), the user can then playback the recorded information at any convenient time.

Generally, different CA systems (e.g., primary or secondary CA servers) have entirely different implementations of EMM and ECM but similar or same descramblers for content protection (e.g., according to the ATSC Standard). In one embodiment of the present invention, a secondary CA server decodes both the EMM and ECM and other client components process the content in standard formats (e.g., using a standard descrambling algorithm).

Figure 6:
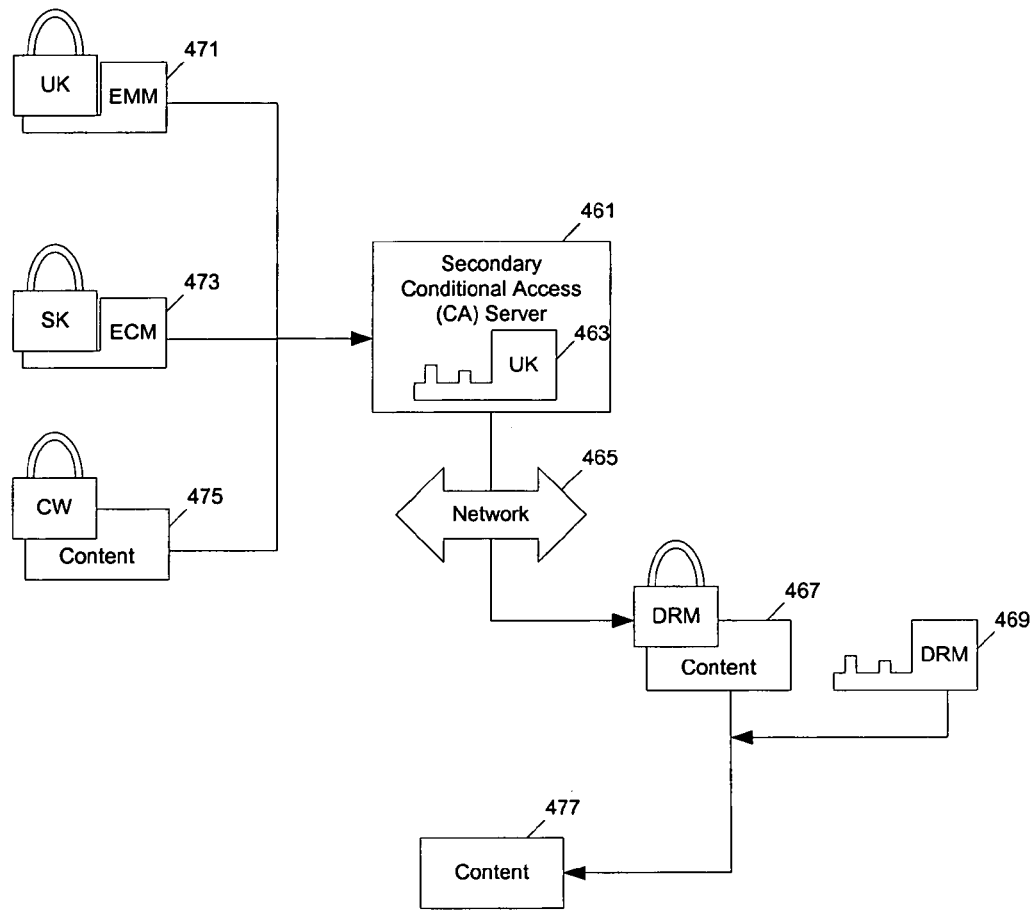
FIG. 6 illustrates a system having a secondary CA server for providing media content to secondary CA clients according to one embodiment of the present invention.

FIG. 6 illustrates a system having a secondary CA server for providing media content to secondary CA clients according to one embodiment of the present invention. In FIG. 6, the secondary CA server (461) has a user key (463) to decrypt the encrypted entitlement management message (EMM 471) and the encrypted entitlement control message (ECM 473) and the scrambled content (475). The secondary CA server descrambles the content and provides the DRM protected content (467) through the network (465) so that only the secondary CA client with the appropriate rights (469) can use the content (477).

In one embodiment of the present invention, the secondary CA server (461) includes one or more bridges and a storage device. The content can be recorded and stored in the storage device for later viewing or provided for real time use. The secondary CA server may directly record the original CA protected content, or record the descrambled content (with encryption for DRM protection), or record the content with substitutive CA protection (e.g., with replacement entitlement control message, or rescrambling using a different control word). In one embodiment of the present invention, the DRM protected content (467) is provided to the secondary CA clients according to the rights determined from EMM (and/or ECM) messages (e.g., at the time of recording and/or the time of playback).

Figure 7:
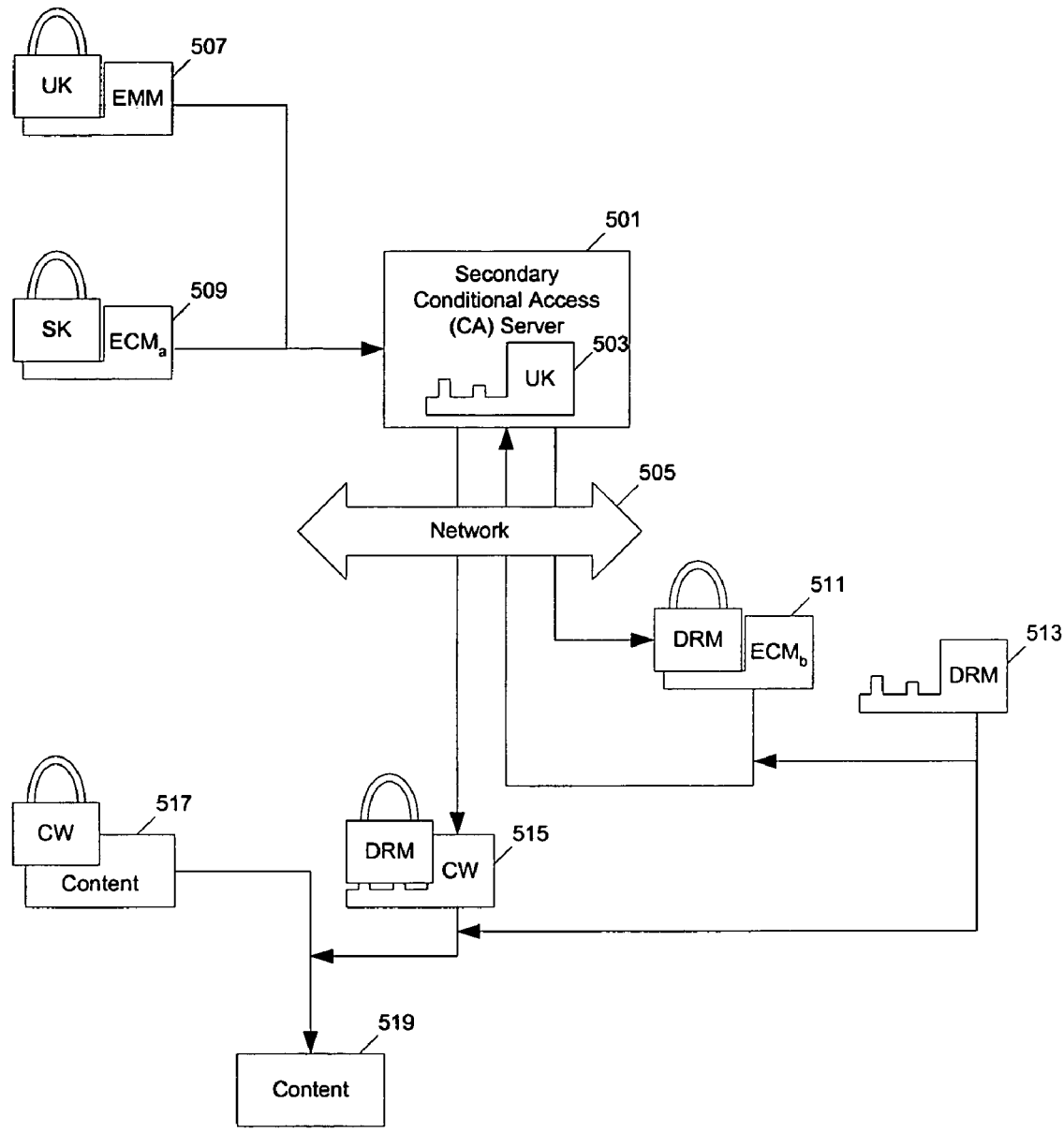
FIG. 7 illustrates a system having a secondary CA server for decoding entitlement control messages for secondary CA clients according to one embodiment of the present invention.

FIG. 7 illustrates a system having a secondary CA server for decoding entitlement control messages for secondary CA clients according to one embodiment of the present invention. In FIG. 7, the secondary CA server (501) with the user key (503) decodes the entitlement management message (EMM 507) and the entitlement control message ($ECM_a$ 509) to provide, over the network (505), the local entitlement control message ($ECM_b$ 511), which is protected under a DRM system. The secondary CA client with the rights (513) to the local entitlement control message ($ECM_b$ 511) can use the control word (515) in $ECM_b$ (511) to descramble the content (517). Typically, the secondary CA client sends the local entitlement control message ($ECM_b$ 511) back at the playback time for the control word (515) and then generates the clear content (519) using the control word (515) received from the secondary CA server (501). In one embodiment, the clear content (519) is rescrambled using a different scheme before stored on a storage. Alternatively, the descrambled content (519) can be recorded and stored in a storage under the protection of a DRM system.

Alternatively, a storage records the scrambled content (517) with the DRM protected $ECM_b$ (511) so that a device with rights (513) can retrieve the media content (517) and $ECM_b$ (511) for viewing at a different time. The decoded entitlement control message $ECM_b$ (511) may be used to replace the original encrypted entitlement control message $ECM_a$ (509) to generate a stream for storage and access under the DRM system. Since the use of the decoded entitlement control message ($ECM_b$ 511) does not require the service key of the primary security system, the management of the recorded content can be simplified.

In one embodiment of the present invention, a secondary CA server generates substitutive entitlement control messages which are encrypted for decryption by a different service key that is managed by the secondary CA server (e.g., generated and maintained by the CA server). Typically, the CA system of a primary security system changes the service key periodically (e.g., once a month). Entitlement control messages recorded from different time periods need different service keys for decryption. In one embodiment of the present invention, to simplify the service key management for the recorded content, a secondary CA server re-encrypts the entitlement control message to generate a substitutive entitlement control message for recording. The secondary CA server can later decrypt the substitutive entitlement control message without using the original service key.

Figure 8:
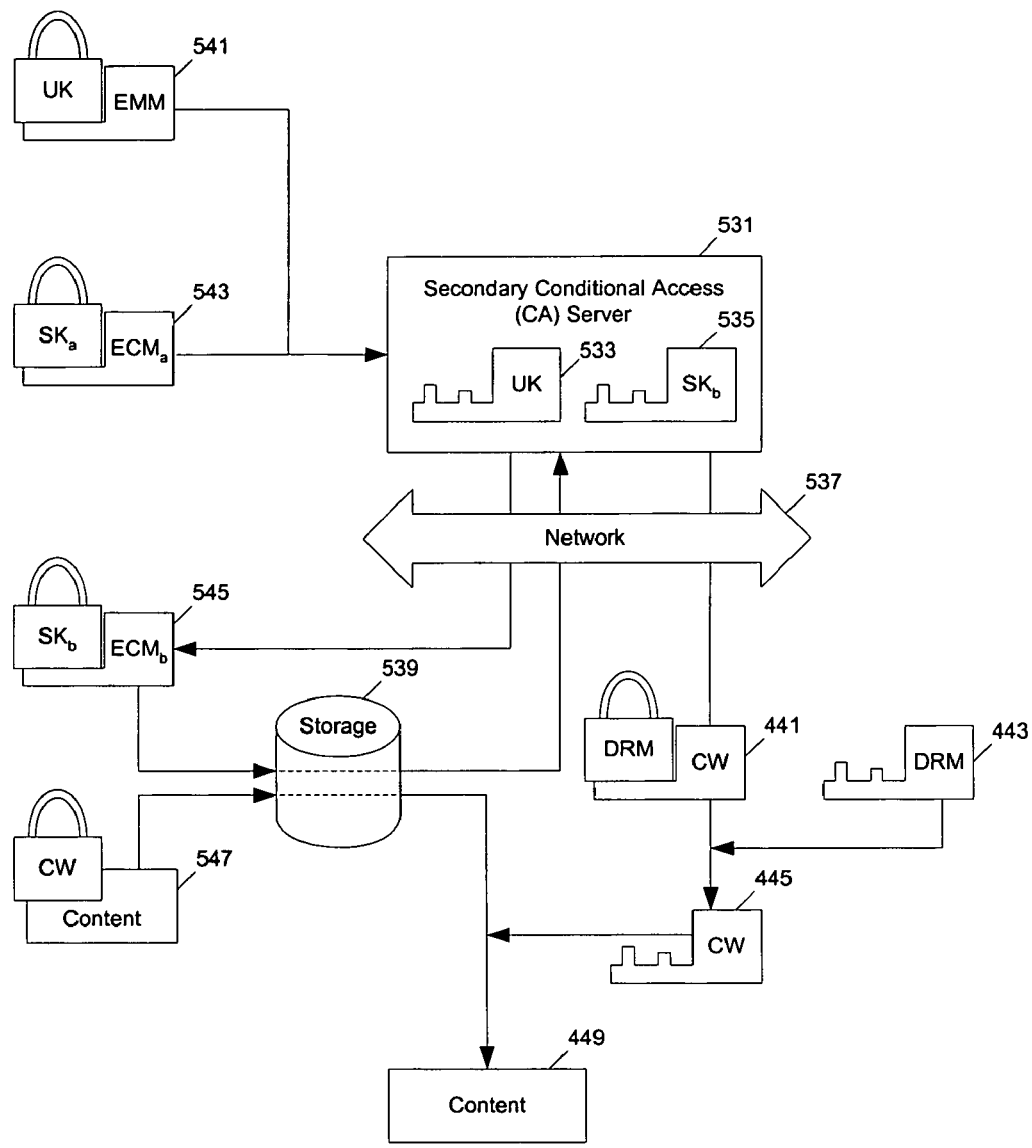
FIG. 8 illustrates a system having a secondary CA server for providing substitutive entitlement control messages to secondary CA clients according to one embodiment of the present invention.

FIG. 8 illustrates a system having a secondary CA server for providing substitutive entitlement control messages to secondary CA clients according to one embodiment of the present invention. In FIG. 8, the secondary CA server (531) receives the entitlement management message (EMM 541) and the entitlement control message ($ECM_a$ 543) which is to be decrypted using a service key ($SK_a$) provided by the EMM (541). The secondary CA server (531) decrypts the EMM (541) using the user key (533) to obtain the service key ($SK_a$) and then further decrypts the $ECM_a$ (543) using the service key ($SK_a$) and obtains the control word (CW). The secondary CA server manages a service key $SK_b$ (535) and re-encrypts the control word to create a local entitlement control message ($ECM_b$ 545), which can then be decrypted using the service key $SK_b$ (535). The decryption of the local entitlement control message $ECM_b$ (545) does not need the original service key ($SK_a$) sent in the EMM (541). The secondary CA server (531) provides the $ECM_b$ (545) as a substitutive entitlement control message to a secondary CA client through the network (537). The original entitlement control message ($ECM_a$ 543) is replaced with the substitutive entitlement control message ($ECM_b$ 545) to record and store the scrambled content (547) on the storage (539). When the scrambled content is retrieved from the storage (539) for use in a renderer, the secondary CA server (531) can decode the $ECM_b$ (545) using the service key ($SK_b$ 535) to retrieve the control word in the $ECM_b$ (545). The secondary CA server can then provide the control word to a secondary CA client in a way illustrated in FIG. 5. The secondary CA server (531) may further determine whether or not to release the control word based on the entitlement management message received at the time of decrypting the substitutive control message ($ECM_b$ 545). In one embodiment, the information stored on the storage (539) is further protected under a DRM system.

In a typical conditional access of a primary security system (e.g., digital TV or satellite TV), the control word changes frequently (e.g., once every 0.1 second). To protect the recorded and stored content, which may be further protected under a DRM system, it may not be necessary to change the control word as frequently. For example, an entire recorded movie may be rescrambled using one control word. In one embodiment of the present invention, a secondary CA server is used to descramble and re-scramble the CA protected content for recording.

Figure 9:
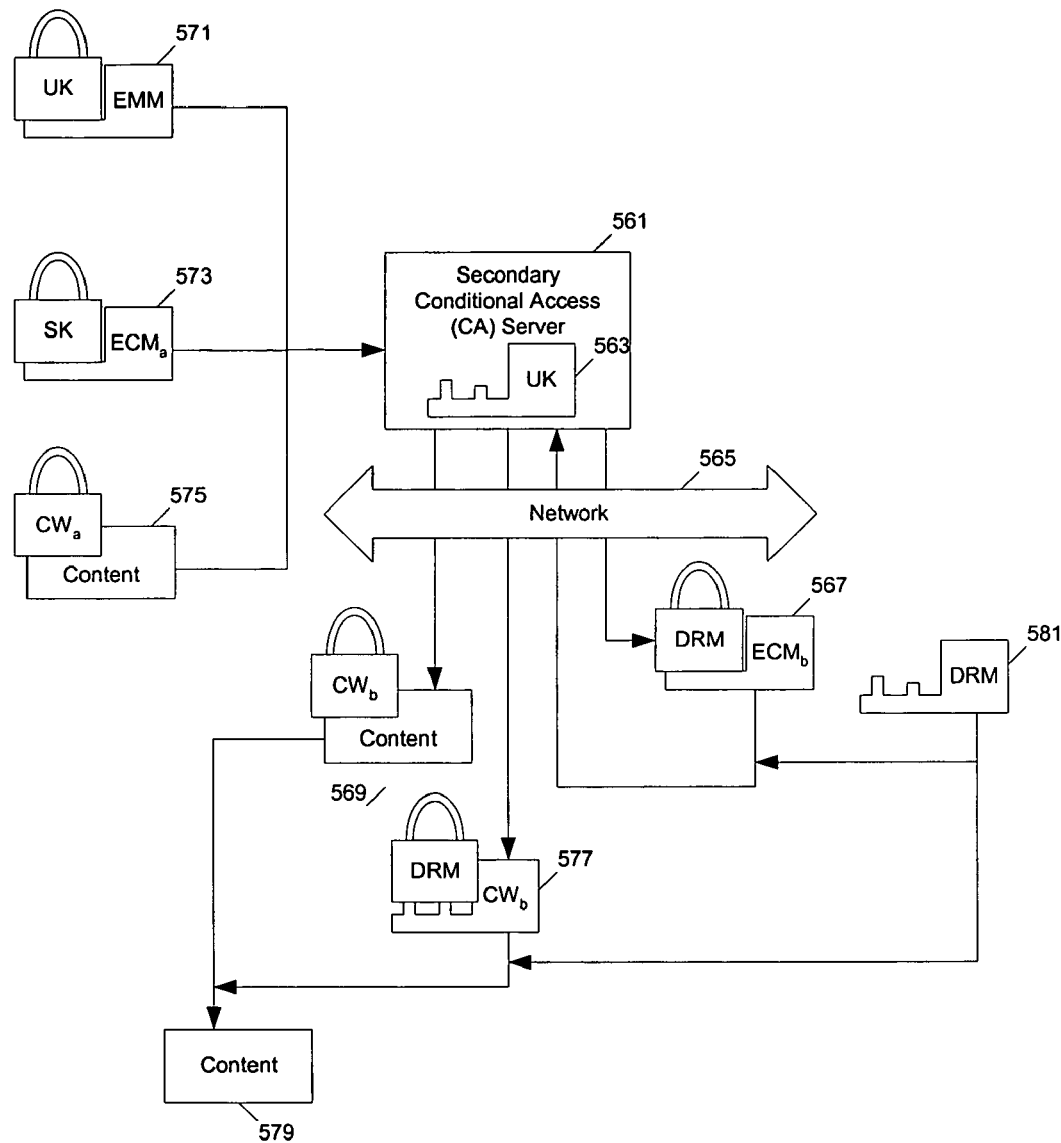
FIG. 9 illustrates a system having a secondary CA server for re-scrambling media content for secondary CA clients according to one embodiment of the present invention.

FIG. 9 illustrates a system having a secondary CA server for re-scrambling media content for secondary CA clients according to one embodiment of the present invention. In FIG. 9, the secondary CA server (561) receives the broadcast, including the entitlement management message (EMM 571), the entitlement control message ($ECM_a$ 573) and the scrambled content (575). The secondary CA server (561) uses the user key (563) to access the data in EMM (571) (e.g., recovering the service key), to access the data in $ECM_a$ (573) (e.g., recovering the control word), and to descramble the content (575). The secondary CA server (561) then rescrambles the content (e.g., using a different control word) and provides the rescrambled content (569) with the new entitlement management message ($ECM_b$ 567) to one or more secondary CA clients through the network (565). In one embodiment, the $ECM_b$ (567) is protected under a DRM system so that only the secondary CA clients with appropriate rights (581) can challenge the secondary CA server by sending the $ECM_b$ (567) at playback time and get in return the control word ($CW_b$ 577) for descrambling the content (569) to recover the clear content (579). In one embodiment of the present invention, the $ECM_b$ (567) is further encrypted for decryption with a substitutive service key in a way similar to that illustrated in FIG. 8.

Figure 10A:
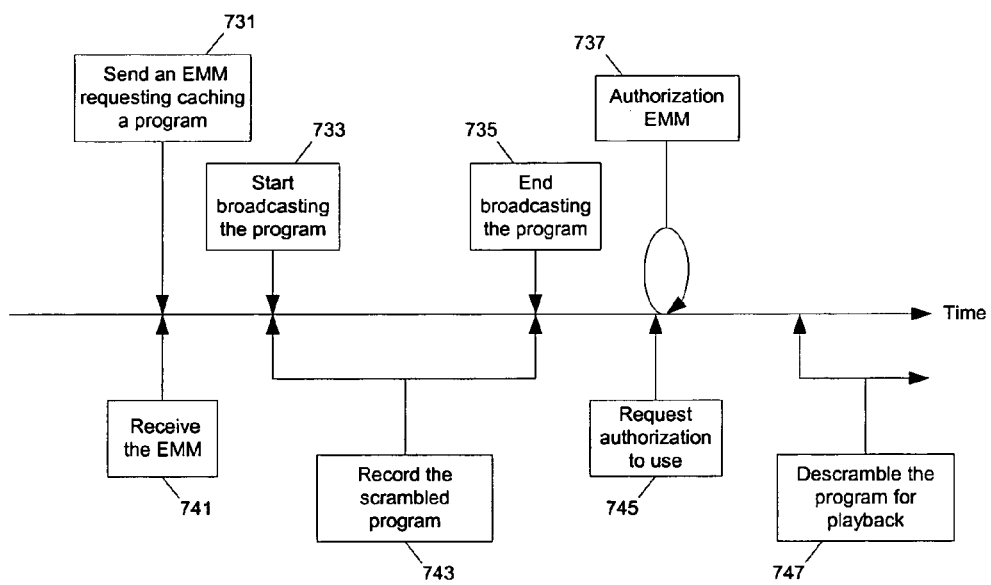
FIG. 10A illustrates an authorization process for recorded media content according to one embodiment of the present invention.

FIG. 10A illustrates an authorization process for recorded media content according to one embodiment of the present invention. In FIG. 10A, the primary CA system (e.g., a digital TV system, or a satellite TV system) first sends (731) an entitlement management message (EMM) requesting caching of a program. The user may not already subscribe to the program (e.g., a movie or a sport program). Thus, the device of the user may not be authorized to descramble the program. According to one embodiment of the present invention, the device of the user can record (743) the scrambled program after receiving the EMM that requests caching the program at a subscriber system. The primary CA system then starts (733) broadcasting the program. After a period of time based on the length of the program, the content providing system ends (735) broadcasting the program. During the period, the device of the user records (743) the scrambled program. Since the user is not a subscriber to the program, the device is not authorized to playback the scrambled content at the time of recording. After the recording, the user may be prompted for availability of the program. If the user requests (745) authorization (which may be at any time) to use the recorded program, an authorization EMM (737) is generated. The authorization EMM may be generated locally at the device, in a way similar to impulse pay per view (IPPV), or generated after the user calls the operator to obtain the authorization, in a way similar to over the phone pay per view (OPPV), or generated after the device transmits the request to the CA system through a data connection, in a way similar to Video-on-Demand (VOD). Once the device obtains the authorization to playback the recorded program, the device can descramble the program for playback (747).

In one embodiment of the present invention, a secondary CA server is used to process and manage the EMM for secondary CA clients. The authorization for playback is requested and granted through the secondary CA server. In one embodiment, the primary CA server is aware of the secondary CA server as a subscriber. For example, the primary CA server is aware of the identity of the secondary CA server and provides authorization according to the subscription status of the secondary CA server. However, the primary CA server may not aware of the identities of the secondary CA clients. In one embodiment of the present invention, the secondary CA server translates the authorization obtained from the primary CA server into authorization for the clients of the secondary server in a way consistent with the policy of the primary CA server.

For example, the secondary CA server may not consume the content; and the secondary CA server may be used to authorize one of its clients to use the subscription and consume the content (e.g., playback the media content in real time or after the media content is recorded). Thus, the secondary CA server may dynamically attach its subscriber identity to one of its clients so that the combined secondary CA server and the corresponding client, which is dynamically selected, can be viewed as a subscriber that is known to the primary CA server.

Further, the secondary CA server may translate access policies in other sophisticated ways. For example, the secondary CA server may determine the authorization of simultaneous access by multiple devices to the same or different media contents. For example, a subscriber may have a subscription to use two independent players to see different channels. Instead of providing the subscriber with two set top boxes with two different identities, the vendor can provide the subscriber with a secondary CA server, which has one identity and authorizes two players to play back the media content according to the authorization from the primary CA server based on the subscription.

Figure 10B:
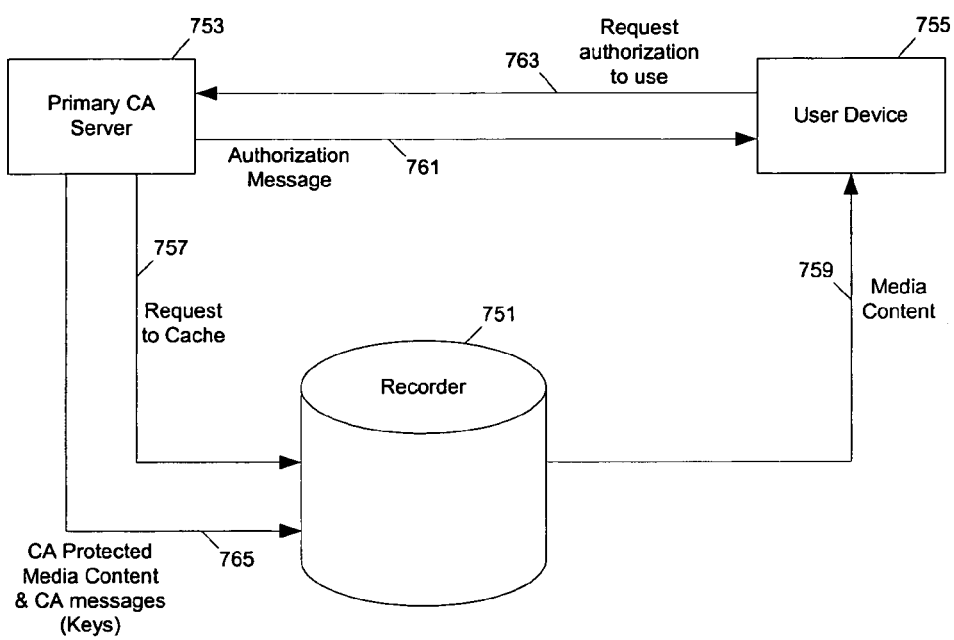
FIG. 10B illustrates a prior art scenario to access recorded content.

FIG. 10B illustrates a prior art scenario to access recorded content. In FIG. 10B, a user device (755), such as a set top box, that has an identity recognized as a subscriber interacts with the primary CA server (753) directly in the authorization process. For example, after the primary CA server sends a request to cache a program to a recorder (751), which is typically a part of a set top box, CA protected media content (765) can be recorded in recorder (751). At the time of recording the user may not be entitled to view the media content. The CA protected media content can then be stored in the recorder (751) in a CA protected format. To use the media content (759), the user device needs authorization from the primary CA server. If the user device has not already obtained the authorization, the user device (755) requests (763) authorization to use in communication with the primary CA server (753), which may then send an authorization message (761) to the user device. The request for authorization may be alternatively sent through a user phone call, or through a data link between the primary CA server (753) and the user device (755).

Figure 10C:
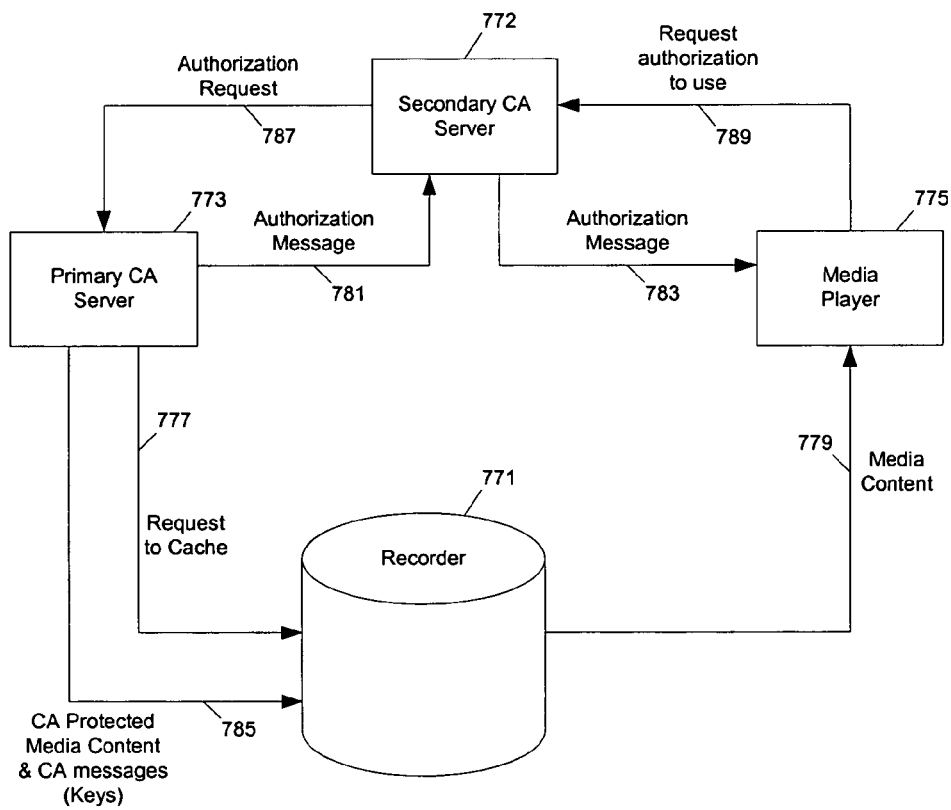
FIG. 10C illustrates a scenario to access recorded content according to one embodiment of the present invention.

In FIG. 10C, the identity of the client of primary CA server (753) is directly attached to the user device which may be authorized according to the identity to remove CA protection from the received media content and play back (consume) the media content.

FIG. 10C illustrates a scenario to access recorded content according to one embodiment of the present invention. In FIG. 10C, the authorization process is through the secondary CA server (772), which is a client of the primary CA server (773). The secondary CA server (772) has an identity recognized as a subscriber of the primary CA server (773). The secondary CA server (772) may forward, translate, and/or manage its authorization received from the primary CA server (773) into authorization for its clients, such as the media player (775). Thus, even though the media player (775) may not have an identity recognizable as a client of the primary CA server (773), through the secondary CA server (772) the media player (775) is effectively recognized as a legitimate subscriber. Thus, one embodiment of the present invention allows the dynamic integration of two devices (e.g., the secondary CA server and a media player) into one logical entity, which may provide the functionality of a traditional set top box.

Further, one embodiment of the present invention allows the separation of the identity of the client of primary CA server (753) in one device (e.g., a secondary CA server) and a user device which may be authorized according to the identity to remove CA protection from the received media content and/or play back the media content. Such an arrangement allows enormous flexibility in a content delivery system according to one embodiment of the present invention. For example, the media player (775) may use a different content protection system, such as a DRM system; the primary CA server don't have to support all media players of its users/subscribers; and the secondary CA sever can be used to extend the service and functionality of the primary CA system. Further, for example, the user can copy the protected content and move it to other storage medium and still be able to watch the content through the control of the secondary CA server. For example, the protected content can be distributed on a local network (e.g., within a home, a hotel, a campus, a building, etc.) through various available communication tools, media and protocols while the rights to use the protected content can be managed though the control of the secondary CA server in accordance with the authorization the secondary CA server obtained from the primary CA server.

In one embodiment, the secondary CA server (772) provides the authorization to its clients in a way consistent with the authorization it obtained from the primary CA server (773). Thus, the secondary CA server (772) conveys legitimate rights to its clients in accordance with the authorization from the primary CA server (773) without providing illegitimate access.

For example, in FIG. 10C, the primary CA server may request (777) the recorder (771) to cache a program. The recorder (771) then records the CA protected media content (785) for later retrieval. The recorder (771) can be a device separated from the secondary CA server (772) and the media player (775), or a component integrated within the secondary CA server (772) or the media player (775). To play back the media content (779), the media player (775) requests (789) authorization to use from the secondary CA server (772), since the media player (775) is not a direct client of the primary CA server (773). If the secondary CA server (772) has not yet obtained the authorization, the secondary CA server (772) sends an authorization request (787) to the primary CA server (773), which can then provide an authorization message (781) to the secondary CA server (772) based on the identity of the secondary CA server (772) as a client of the primary CA server (773). The secondary CA server then sends an authorization message (783) to the media player (775) based on the identity of the media player (775) as a client of the secondary CA server (772), in accordance with the authorization message (781) received from the primary CA server (773).

In one embodiment of the present invention, a secondary CA server has data to represent a subscriber. The secondary CA server is used to processing the entitlement management message and/or the entitlement control message of the primary CA server. A bridge interfaces with the primary security system to reconstitute the data stream, including the entitlement management message, the entitlement control message and the scrambled content. A storage is used to store the content for playing back at a different time. A renderer is used to process the content for presentation. Since the content is typically control word scrambled/descrambled using a standard algorithm, a standard scrambler/descrambler can be continently located on the conditional access, the bridge, or the renderer, depending on the network configuration and/or other considerations.

Although some of the figures (e.g., FIGS. 11-14) and descriptions show a secondary CA server, a bridge, a storage, a renderer separately, it is understood that a secondary CA server, a bridge, a storage, a renderer can be physically combined in various different ways. The communication between these components is not necessarily all through network connections. For example, a secondary CA server may be physically separate from a bridge and a renderer and communicating to the bridge and renderer through a network; and the bridge and the renderer may be physically separated from each other or combined in one device. Alternatively, the secondary CA server may be combined with a bridge, communicating with a renderer over a network, or be combined with a renderer, communicating with a bridge over a network. The storage may be connected through a network to a secondary CA server, a bridge and a renderer, which may be combined in various ways as illustrated above. Alternatively, the storage may be in at least one of the secondary CA server, the bridge and the renderer and connected to the rest of the components through a network. Further, a storage may partially in one component and partially in another. As illustrated in FIG. 3, a networked system may have multiple bridges, multiple renderers and multiple storages. Typically, one secondary CA server is a client of one primary CA server. However, one secondary CA server may also be a client of multiple CA systems.

In one embodiment of the present invention, a secondary CA server is used on a network to provide services to secondary CA clients. For example, a secondary CA server may decode entitlement management messages to determine rights for a DRM system, decode entitlement control messages to recover control words for secondary CA clients, generate substitutive entitlement control messages, descramble CA protected contents for secondary CA clients, rescramble CA protected contents for secondary CA clients, etc.

Figure 11:
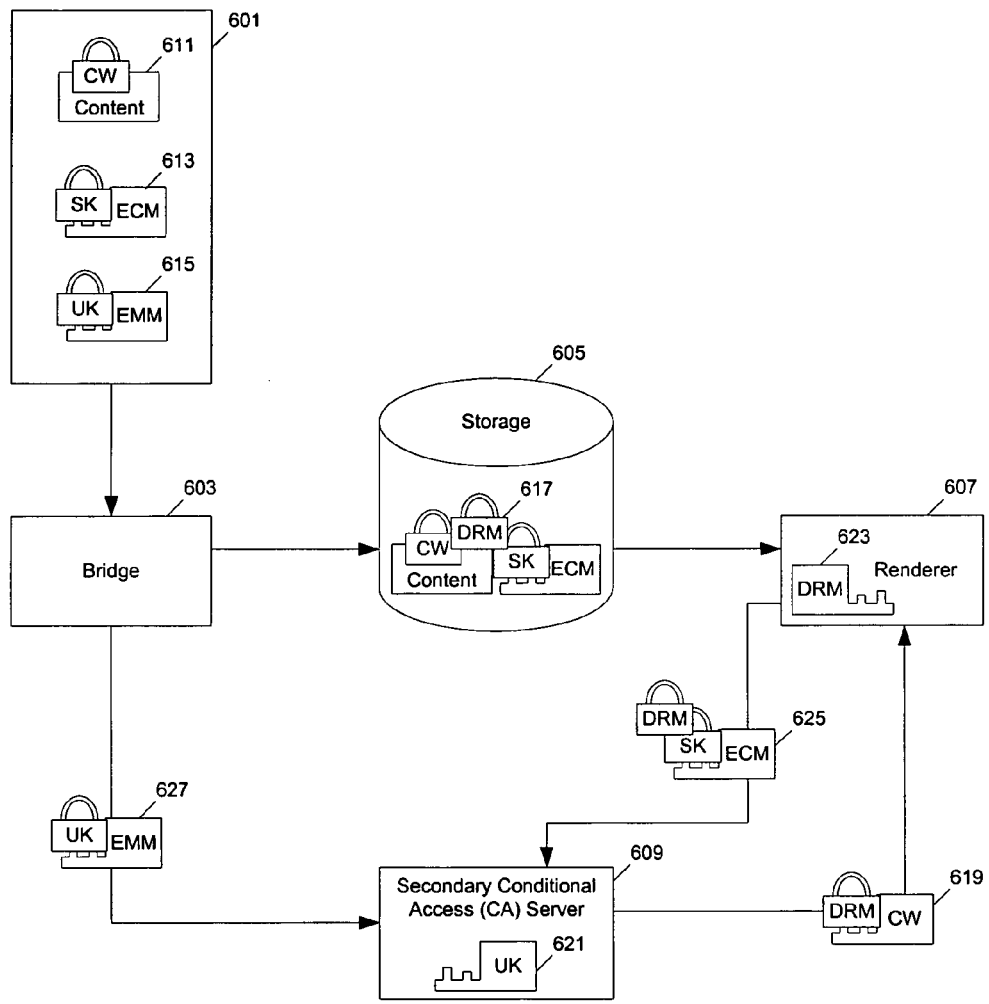
FIG. 11 illustrates a system in which a secondary CA server is configured to decode the control words for the captured media content retrieved from a storage device according to one embodiment of the present invention.

FIG. 11 illustrates a system in which a secondary CA server is configured to decode the control words for the captured media content retrieved from a storage device according to one embodiment of the present invention. In FIG. 11, the bridge (603) interfaces with the primary security system to receive the broadcast feed (601), including the user key (UK) protected entitlement management message (EMM 615), the service key (SK) protected entitlement control message (ECM 613) and the control word (CW) scrambled content (611).

The bridge (603) may include one or more components, such as a tuner, a transcrambler, a transcoder, a physical interface, a network communication interface, a cable, a storage device, etc.

The bridge (603) sends the entitlement management message (627) to the secondary CA server (609), which has the user key (621) that represents the identity of the subscriber. The secondary CA server (609) determines the entitlement of the subscriber to the content from the entitlement management message (627). For example, the secondary CA server (609) uses the user key (621) to retrieve the service key from the entitlement management message (627). The storage (605) stores the content and the entitlement control message (617) under the protection of a DRM system.

Although FIG. 11 shows a link between the bridge (603) and the storage (605), it is understood that the recording of the content is not necessary through a direct path from the bridge to the storage. For example, the content and the entitlement control message may be sent to the secondary CA server, which then records the content into the storage (605) in accordance to the data in EMM (627). The storage (605) can be physically integrated within the secondary CA server (609). Alternatively, or in addition, the bridge (603) may be physically integrated within the secondary CA server (609).

In one embodiment of the present invention, only the content that the subscriber is entitled to according to the EMM at the time of recording is recorded into the storage (605). For example, the storage (605) may be a separate network device or integrated within the bridge (603); and the secondary CA server (609) authorizes the bridge (603) to record the content in accordance with the entitlement of the EMM (627).

In one embodiment of the present invention, the bridge records the content on the storage. In one embodiment, the bridge records only the content that the subscriber is entitled to use at the time of recording. Based on the data in EMM (627), the secondary CA server determines whether or not the subscriber is entitled to use the scrambled content and sends a message to the bridge about the determination. The secondary CA server maintains data derived from the EMM (627), such as the service key, so that the recorded content can be later decrypted/descrambled after the recorded content is retrieved from the storage (605) for use.

Alternatively, the bridge may record the scrambled content and the entitlement control message regardless the entitlement. The secondary CA server maintains data derived from the EMM (627), such as the service key, so that the recorded content can be later correlated with the corresponding data derived from the EMM (627) for decryption/descrambling operations.

After the renderer (607) retrieves the recorded content and the associated entitlement control message (617) from the storage (605), the renderer (605) sends the entitlement control message (625) to the secondary CA server (609) protected by the DRM system. The secondary CA server (609) decodes the entitlement control message (625) and releases the control word (619) only when the access criteria are satisfied. The released control word (619) is protected under a DRM system so that only the renderer (607) with the appropriate rights (623) can use the released control word (619) to descramble the content retrieved from the storage (605).

In one embodiment of the present invention, the released control word (619) is access controlled according to the entitlement management message received for the time period when the content is recorded and/or according to the entitlement management message received for the time period when the content is retrieved for use. For example, a movie may be played back at any time after being recording if the subscriber is entitled to view it at the time of recording. Alternatively, a recorded movie may be viewed only if the user is a current subscriber. Thus, even if the user is authorized to play the movie at the time of recording, the secondary CA server still needs to verify that the user is currently a subscriber at the time of playback according to the entitlement management message for the current time period. In one embodiment of the present invention, a movie can be recorded even if the subscriber is not entitled to view it at the time of recording, since the entitlement may be obtained after the recording.

In one embodiment of the present invention, a CA system can send entitlement management messages for delayed authorization. For example, an entitlement management message may include a service key for the system to record the content without the authorization for playback. The secondary CA server (609) can manage the service key so that when the user is subsequently authorized to view the content, the CA system of the primary security system does not have to recall which service key was used for the recorded content. When the user obtains the authorization to view after the recording (e.g., through a pay-per-view scheme, or upgrading the subscription package), the secondary CA server (609) can decrypt the entitlement control message using the service key maintained by the secondary CA server.

In one embodiment of the present invention, the secondary CA server (609) communicates with the bridge (603) and the renderer (607) through a network connection. Alternatively, the secondary CA server (609) may communicate with either the bridge (603) or the renderer (607) through a network connection (e.g., when the secondary CA server is integrated with either the renderer or the bridge).

Figure 12:
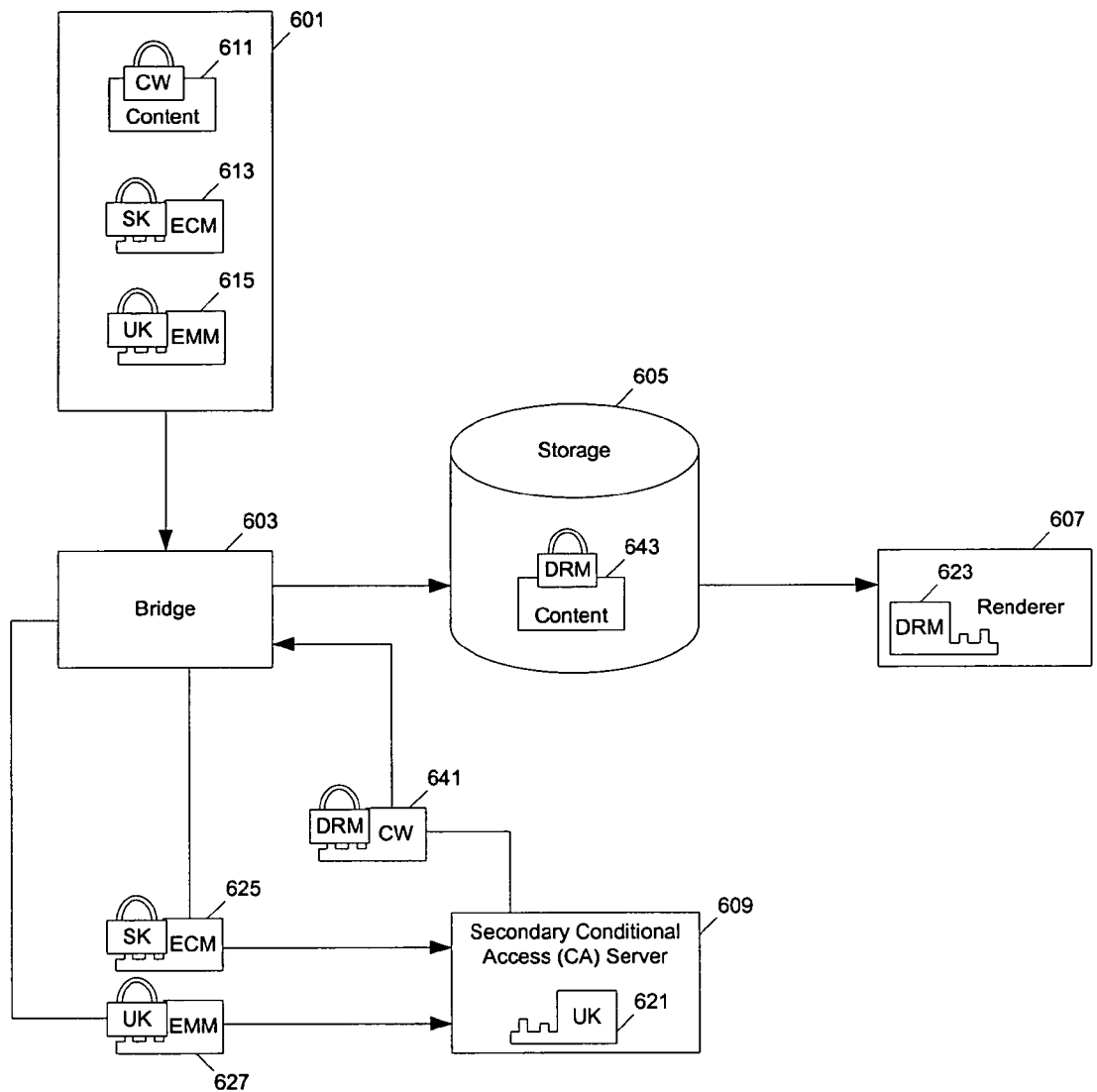
FIG. 12 illustrates a system in which a secondary CA server is configured to decode the control words for capturing media content into a storage device according to one embodiment of the present invention.

FIG. 12 illustrates a system in which a secondary CA server is configured to decode the control words for capturing media content into a storage device according to one embodiment of the present invention. In FIG. 12, the bridge (603) receives the broadcast feed (601), which includes the EMM (615), ECM (613) and CA protected content (611). The bridge (603) provides the EMM (627) and ECM (625) to the secondary CA server (609), which has the user key (621). The secondary CA server (609) recovers the control word (641) for descrambling the content. The secondary CA server provides the DRM protected control word to the authorized bridge (603) through a network connection. The authorized bridge descrambles the content and stores the content in the storage (605). The recorded content (643) in the storage (605) is protected using a DRM system. Only the renderer (607) with the appropriate rights (623) can use the recorded content (643). In one embodiment of the present invention, the rights to the recorded content (643) are derived from the entitlement management message and the entitlement control message of the CA system of the primary security system. In one embodiment, the rights are derived from the messages at the time of recording. In one embodiment of the present invention, the rights may be further changed according to subsequent entitlement management messages.

In one embodiment, the bridge (603) is combined with renderer (607), which can play back the media content in real time. Since the control word is provided through the network, unpredictable network delay may cause glitches in synchronizing the control word with the media stream. In one embodiment of the present invention, the bridge buffers a time period of media stream so that the network delay does not interrupt the continuous playback of the media stream.

In one embodiment of the present invention, a system can automatically switch between removing the CA protection at the time of recording and removing the CA protection at the time of playing back. For example, the system may automatically remove the CA protection at the time of recording for the content that the user is entitled to use at the time of recording and remove the CA protection at the time of playing back for the content that the user is not entitled to use at the time of recording. Alternatively, the switching may be based on a user preference, or based on the capability of the components used on the system (e.g., whether or not a bridge has a standard descrambler, or whether or not renderer has a standard descrambler), or partially based on the data in an entitlement management message.

Figure 13:
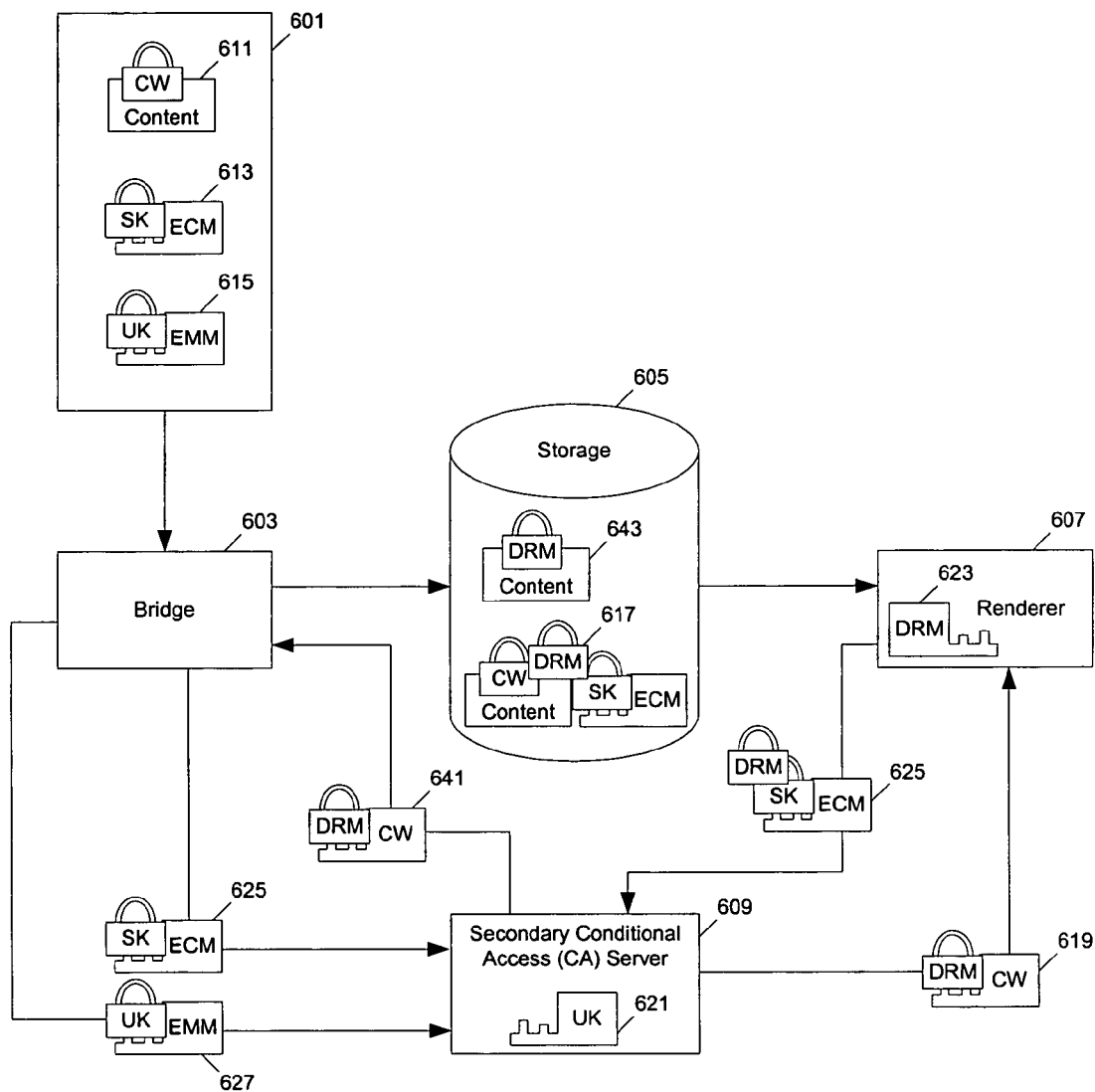
FIG. 13 illustrates a system in which a secondary CA server is configured to automatically decode the control words before capturing media content into a storage device, or after retrieving captured media content from the storage device, according to one embodiment of the present invention.

FIG. 13 illustrates a system in which a secondary CA server is configured to automatically decode the control words before capturing media content into a storage device, or after retrieving captured media content from the storage device, according to one embodiment of the present invention. In FIG. 13, the bridge (603) receives the broadcast (601), which includes the EMM (615), ECM (613) and CA protected content (611). The bridge (603) provides the EMM (627) and ECM (625) to the secondary CA server (609), which has the user key (621). For the content that the user is entitled to use at the time of recording, the secondary CA server (609) extracts the control word (641) from the ECM (625) and EMM (627) for the bridge (603). The bridge (603) can then descramble the content. After the CA protection is removed, the content (643) in the storage (605) is placed in a DRM system to prevent unauthorized use. If the CA protection for the content is to be removed at the time of playback, the scrambled content and the ECM (617) are stored in the storage (605), protected by the DRM system. Alternatively, the secondary CA server (609) may manage the service keys for the decryption of the entitlement control message at a later time. After retrieving the CA protected content, if the CA protection is not already removed, the renderer (607) sends the ECM (625) to the secondary CA server (609) protected by the DRM system, which releases the control word (619) only to a renderer (607) with the appropriate rights (623).

In one embodiment of the present invention, a system according to the present invention performs a CA translation so that the condition access protection for a recorded content is more suitable for the protection of content stored on a storage.

Figure 14:
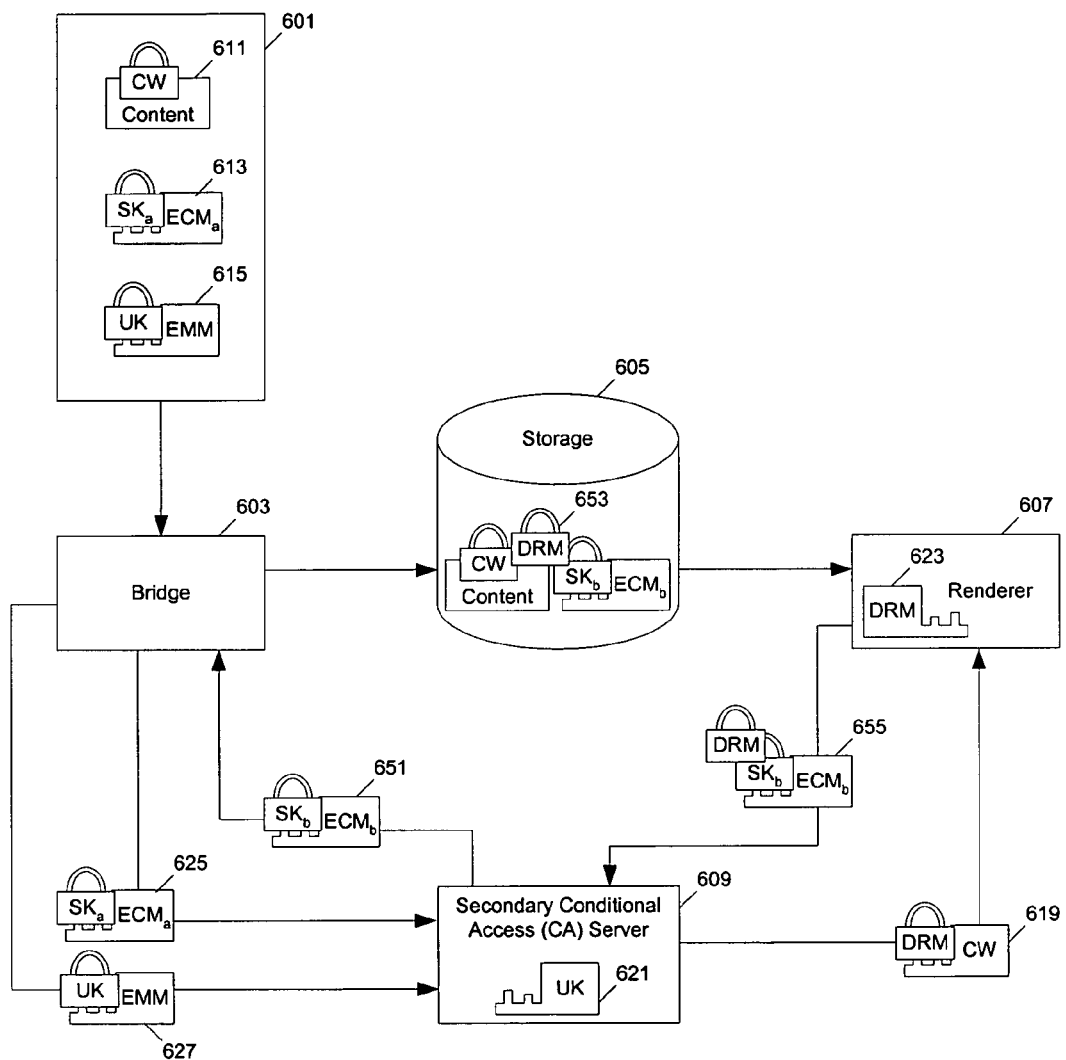
FIG. 14 illustrates a system in which a secondary CA server is configured to generate substitutive entitlement control messages and decode the control words for the captured media content retrieved from a storage device according to one embodiment of the present invention.

FIG. 14 illustrates a system in which a secondary CA server is configured to generate substitutive entitlement control messages and decode the control words for the captured media content retrieved from a storage device according to one embodiment of the present invention. In FIG. 14, the bridge (603) receives the broadcast (601), which includes the EMM (615), $ECM_a$ (613) and CA protected content (611). The bridge (603) provides the EMM (627) and $ECM_a$ (625) to the secondary CA server (609), which has the user key (621). The secondary CA server (609) decrypts the $ECM_a$ (625) and generates the local $ECM_b$ (651). The local $ECM_b$ (651) is provided as a substitutive entitlement control message to replace the original entitlement control message for recording. Typically only the secondary CA server (609) can decrypt the local $ECM_b$ (651). For example, the secondary CA server (609) may generate a unique service key to create local entitlement control message; alternatively, the secondary CA server (609) may encrypt the entitlement control message so that the local entitlement control message can only be decrypted using the user key (621). The local entitlement control message replaces the original entitlement control message; and the local entitlement control message and the scrambled contents are recorded in the storage (605). The recorded data (653) in the storage (605) may be optionally protected using a DRM system. To use the recorded content, the renderer (607) sends the local entitlement control message (655) back to the secondary CA server (609) protected by the DRM system to get in return the control word (619). To prevent unauthorized access, the secondary CA server provides the control word (619) under the protection of a DRM system so that only the renderer (607) with the appropriate rights (623) can used the control word (619).

In one embodiment of the present invention, a substitutive entitlement control message contains a control word that is different from the original control word in the original entitlement control message. In addition to sending the substitutive entitlement control message to the bridge (603), the secondary conditional server (609) also sends the original and the substitutive control words to the bridge (603), under the protection of a DRM system. The bridge (603) then descrambles the content using the original control word, re-scrambles the content using the substitutive control word, and replaces the original entitlement control message with the substitutive entitlement control message for recording. In one embodiment of the present invention, the CA protection is translated so that the CA protection for the recorded content is suitable for the management of playing back. For example, an entire recorded movie may be re-scrambled using one same control word so that only one control word is need to play the entire recorded movie. In one embodiment of the present invention, the bridge and the secondary CA server are combined in one; thus, the secondary CA server can performed the task of the descrambling/re-scrambling. Alternatively, the bridge may send the content to the secondary condition access server through a network connection for the descrambling/re-scrambling task, which may increase the network traffic substantially.

Figure 15:
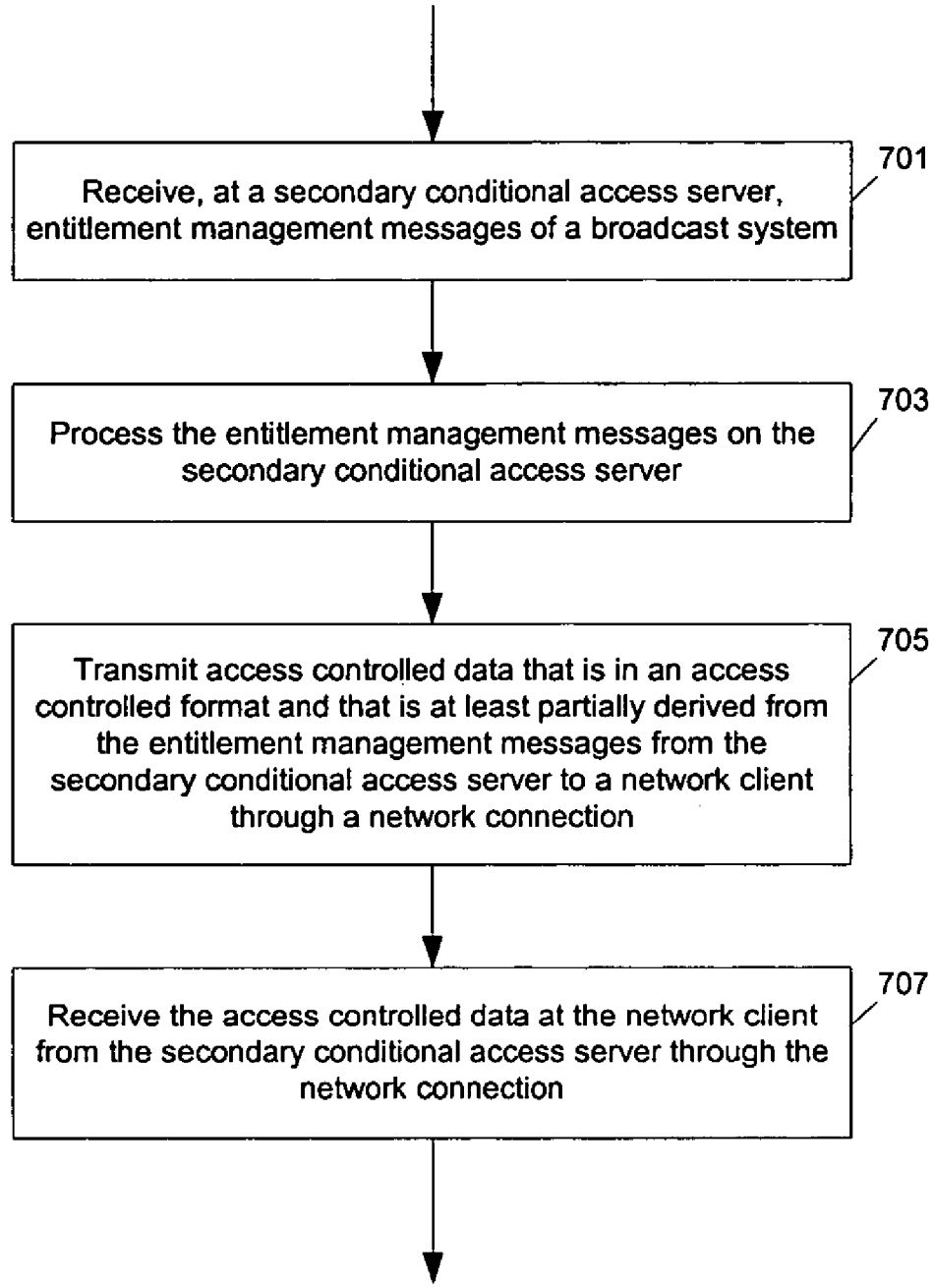
FIG. 15 shows a method of using a secondary CA server according to one embodiment of the present invention.

FIG. 15 shows a method of using a secondary CA server according to one embodiment of the present invention. Operation 701 receives, at a secondary CA server, entitlement management messages of a primary security system (e.g., digital cable television, or satellite television, or a digital radio broadcast system). The entitlement management messages may be directly received from the primary security system, or indirectly received from a bridge through a network connection. Operation 703 processes the entitlement management messages on the secondary CA server. The secondary CA server has data (e.g., a user key) representing the subscriber, which is used to access data in the entitlement management messages. Operation 705 transmits access controlled data that is in an access controlled format and that is at least partially derived from the entitlement management messages from the secondary CA server to a secondary CA client through a network connection. Operation 707 receives the access controlled data at the secondary CA client from the secondary CA server through the network connection. The access controlled data can be entitlement (such as a service key) extracted from the entitlement management messages, control word, a decrypted entitlement control message (e.g., for an entitlement control message received directly from the primary security system, indirectly from a bridge across a network connection, or retrieved from a storage), a substitutive entitlement control message, control word descrambled content, control word rescrambled content, etc.

Figure 16:
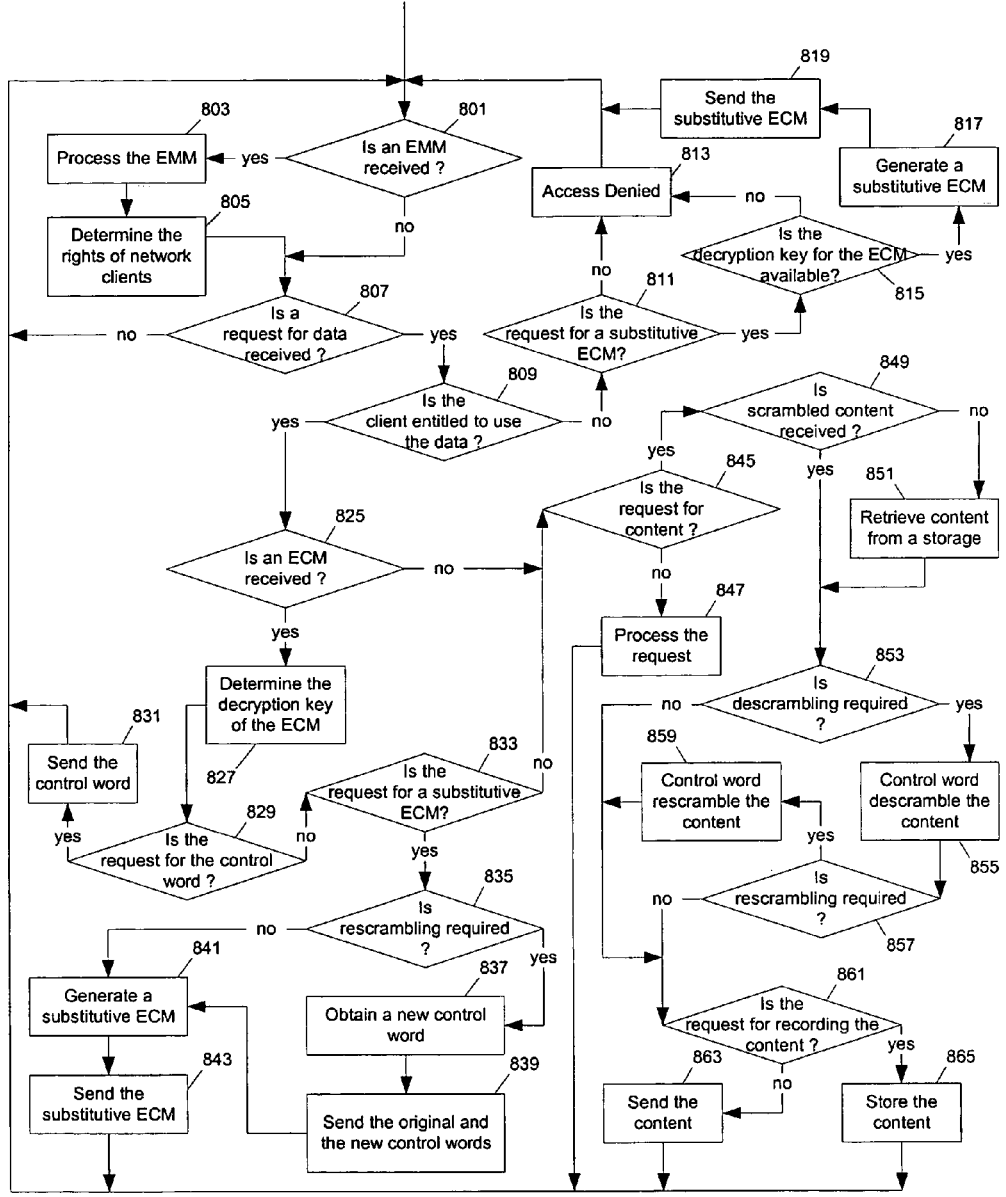
FIG. 16 shows a detailed method of a secondary CA server according to one embodiment of the present invention.

FIG. 16 shows a detailed method of a secondary CA server according to one embodiment of the present invention. In one embodiment of the present invention, a secondary CA server can provide services to various different clients according to the requests received from the secondary CA clients. Operation 801 determines if an entitlement management message (EMM) is received. If an EMM is received (e.g., from a network bridge, or directly from the broadcast), operation 803 processes the EMM; and operation 805 determines the rights of secondary CA clients according to the data in the EMM. For example, the secondary CA server can extract the entitlement (such as the service key). Operation 807 determines if a request for data is received from a secondary CA client. If a request for data is received, operation 809 determines if the client is entitled to use the data.

In one embodiment of the present invention, a network bridge may record the content even if the subscriber is not entitled to use the content at the time of recording, since the subscriber may obtain the authorization to use the recorded content after the content is recorded. The network bridge may request a substitutive ECM even if the bridge is not entitled to use. The substitutive ECM is encrypted so that the network bridge cannot obtain the control word from the substitutive ECM. The network bridge can replace the original ECM with the substitutive ECM for recording so that when the subscriber later obtains the authorization to play back the content, the secondary CA server can decrypt the substitutive ECM.

In one embodiment, if operation 809 determines the client is not entitled to use the data and operation 811 determines the request is not for a substitutive ECM, access to the data is denied in operation 813. If the request is for a substitutive ECM, operation 815 determines if the decryption key for the ECM is available. In one embodiment of the present invention, a CA system may or may allow the recording of certain content. Thus, the secondary conditional server may or may not have the decryption key for the ECM. If the decryption is not available, operation 813 denies the access; otherwise, operation 817 generates a substitutive ECM through decrypting the original ECM and re-encrypting the ECM so that the substitutive ECM can be later decrypted using a key available to the secondary CA server. Operation 819 then sends the substitutive ECM to the secondary CA client.

If operation 809 determines the client is entitled to use the data, operation 825 determines if an ECM is received for processing. An ECM may be received from a secondary CA client (e.g., from a bridge that obtains the ECM from the broadcast, or from a renderer that obtains the ECM from a storage for recorded media content) or directly from the broadcast. If an ECM is received for processing, operation 827 determines the decryption key of the ECM. The decryption key may be derived from a recently received EMM, or from the data maintained by the secondary CA server for recorded content. The decryption key can be used to access the control word in the ECM. If operation 827 determines that the request is for the control word, operation 831 sends the control word to the secondary CA client. The control word can be sent in a similar way for sending the service key to prevent unauthorized use. Other data, such as descrambled content, can also be sent in a similar way.

If operation 829 determines the request is not for the control word and operation 833 determines the request is for a substitutive ECM, operation 835 determines if rescrambling is required. If rescrambling is required, operation 837 obtains a new control word; and operation 839 sends both the original and the new control words to the secondary CA client. Operation 841 generates a substitutive ECM. The substitutive ECM has the new control word if rescrambling is required; otherwise, the substitutive ECM contains the original control word. Operation 843 then sends the substitutive ECM to the secondary CA client.

If operation 845 determines the request is for content, operation 849 determines whether the scrambled content is received. If the content is not received, operation 851 retrieves the content from a storage. In one embodiment of the present invention, the secondary CA server has a storage to record the scrambled content. Then, the secondary CA server processes the scrambled content.

If operation 853 determines descrambling is required, operation 855 control word descrambles the content using the control word in the ECM associated with the content. If operation 857 determines that rescrambling is required, operation 859 control word rescrambles the content using a new control word. If operation 861 determines that the request is for recording the content, operation 865 stores the content; otherwise, operation 863 sends the content to the secondary CA client.

If operation 845 determines the request is for the content, operation 847 further processes request. For example, the client may request the entitlement information, available contents recorded on a storage, rights to play back or record, or others.

It is understood that FIG. 16 illustrates an example flow chart of the operations in a secondary CA server according to one embodiment of the present invention. Some implementations of secondary CA servers may include more or less operations. And the operation sequences are illustrative. From this description, one person skilled in the art understands that many variations and combinations can be implemented.

In one embodiment of the present invention, various components, such as a bridge, a renderer, a secondary CA server, a storage, or various different combinations of these components, can be implemented using a digital data processing system, such as a computer.

Figure 1:
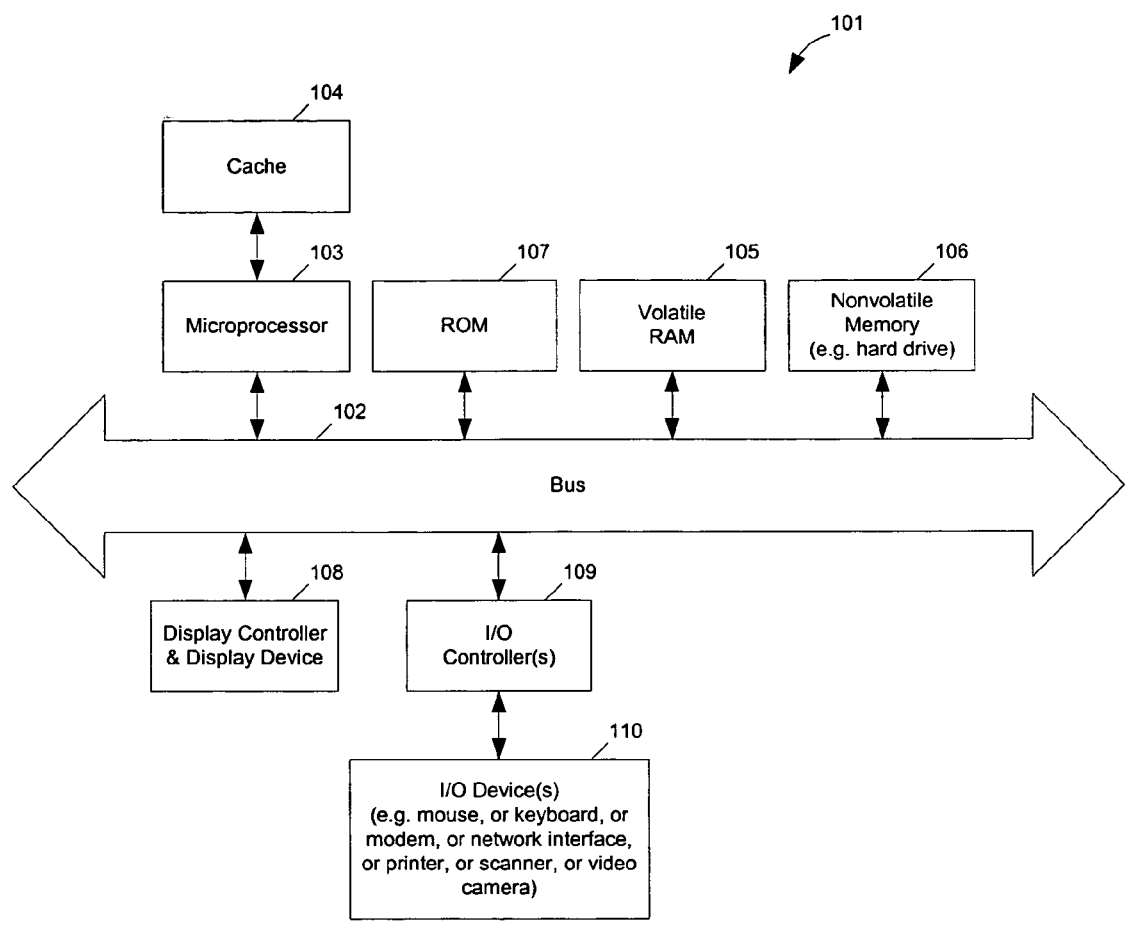
FIG. 1 shows a block diagram example of a data processing system which may be used with the present invention.

FIG. 1 shows one example of a typical computer system which may be used with the present invention. Note that while FIG. 1 illustrates various components of a computer system, it is not intended to represent any particular architecture or manner of interconnecting the components as such details are not germane to the present invention. It will also be appreciated that network computers and other data processing systems which have fewer or more components may also be used with the present invention. The computer system of FIG. 1 may, for example, be a Sun workstation, or a personal computer (PC) running a Windows operating system, or an Apple Macintosh computer, or a set top box, or other media controller.

As shown in FIG. 1, the computer system 101, which is a form of a data processing system, includes a bus 102 and system core logic 112 which interconnect a microprocessor 103, a ROM 107, and volatile RAM 105 and a non-volatile memory 106. The microprocessor 103, which may be, for example, a G3 or G4 or G5 microprocessor from Motorola, Inc. or IBM is coupled to cache memory 104 as shown in the example of FIG. 1. The bus 102 and system core logic 112 interconnect these various components together and also interconnects these components 103, 107, 105, and 106 to a display controller and display device 108 and to peripheral devices such as input/output (I/O) devices which may be mice, keyboards, modems, network interfaces, printers, scanners, video cameras and other devices which are well known in the art. Typically, the input/output devices 110 are coupled to the system through input/output controllers 109. The volatile RAM 105 is typically implemented as dynamic RAM (DRAM) which requires power continually in order to refresh or maintain the data in the memory. The non-volatile memory 106 is typically a magnetic hard drive, a magnetic optical drive, or an optical drive (e.g., a DVD RAM), or other type of memory system which maintains data even after power is removed from the system. Typically, the non-volatile memory will also be a random access memory although this is not required. While FIG. 1 shows that the non-volatile memory is a local device coupled directly to the rest of the components in the data processing system, it will be appreciated that the present invention may utilize a non-volatile memory which is remote from the system, such as a network storage device that is coupled to the data processing system through a network interface such as a modem or Ethernet interface. The bus 102 may include one or more buses connected to one another through various bridges, controllers and/or adapters as is well known in the art. In one embodiment the I/O controller 109 includes a USB (Universal Serial Bus) adapter for controlling USB peripherals, and/or an IEEE-1394 bus adapter for controlling IEEE-1394 peripherals.

It will be apparent from this description that aspects of the present invention may be embodied, at least in part, in software. That is, the techniques may be carried out in a computer system or other data processing system in response to its processor, such as a microprocessor, executing sequences of instructions contained in a memory, such as ROM 107, volatile RAM 105, non-volatile memory 106, cache 104 or a remote storage device. In various embodiments, hardwired circuitry may be used in combination with software instructions to implement the present invention. Thus, the techniques are not limited to any specific combination of hardware circuitry and software nor to any particular source for the instructions executed by the data processing system. In addition, throughout this description, various functions and operations are described as being performed by or caused by software code to simplify description. However, those skilled in the art will recognize what is meant by such expressions is that the functions result from execution of the code by a processor, such as the microprocessor 103.

A machine readable medium can be used to store software and data which when executed by a data processing system causes the system to perform various methods of the present invention. This executable software and data may be stored in various places including for example ROM 107, volatile RAM 105, non-volatile memory 106 and/or cache 104 as shown in FIG. 1. Portions of this software and/or data may be stored in any one of these storage devices.

Thus, a machine readable medium includes any mechanism that provides (i.e., stores and/or transmits) information in a form accessible by a machine (e.g., a computer, network device, personal digital assistant, manufacturing tool, any device with a set of one or more processors, etc.). For example, a machine readable medium includes recordable/non-recordable media (e.g., read only memory (ROM), random access memory (RAM), magnetic disk storage media, optical storage media, flash memory devices, etc.), as well as electrical, optical, acoustical or other forms of propagated signals (e.g., carrier waves, infrared signals, digital signals, etc.), etc.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method to control a presentation of content, the method comprising:
    receiving a representation of content from a first conditional access server which provides the content in an encrypted form and uses a first set of cryptographic keys to protect the content from unauthorized access in a first security domain; and
    presenting the content, at a user's request, through a second conditional access server which is coupled to the first conditional access server;

wherein the presenting of the content is authorized through a client server relationship between the second and the first conditional access servers respectively;

wherein the second conditional access server uses a second set of cryptographic keys to protect the content from unauthorized access in presenting the content in a second security domain; and wherein the first conditional access server authenticates the second conditional access server as one of client devices of the first conditional access server through a first authentication process using a first root of trust and the second conditional access server authenticates client devices of the second conditional access server through a second authentication process which is independent of the first authentication process and wherein the second authentication process uses a second root of trust which is independent of and different than the first root of trust, and wherein the second conditional access server is configured to substitute the first security domain with the second security domain for the client devices under the second root of trust.

2. The method of claim 1, wherein the content is presented by a network client of the second conditional access server using the second set of cryptographic keys.

3. The method of claim 2, wherein the first conditional access server provides the second conditional access server the first set of cryptographic keys for authorized use.

4. The method of claim 3, wherein the user's request is after the first conditional access server provides at least a portion of the content; and the portion of the content is presented in response to the user's request.

5. The method of claim 2, wherein the second set of cryptographic keys comprises a key of a digital rights management system; and the network client is a digital rights management client.

6. The method of claim 5, wherein the second conditional access server authorizes the network client to use the content through the digital rights management system in accordance with authorization to use received from the first conditional access server.

7. The method of claim 1, wherein the second conditional access server translates authorization to access the content from authorization received from the first conditional access server to authorization for the network client.

8. The method of claim 1, wherein the second set of cryptographic keys consists one key.

9. The method of claim 1, wherein the second conditional access server acts as a primary conditional access server to another secondary conditional access server.

10. A non-transitory machine readable medium containing executable computer program instructions which when executed by a data processing system cause said system to perform a method to control a presentation of content, the method comprising:

receiving, at a second conditional access server, a first set of cryptographic keys from a first conditional access server which provides a representation of content in an encrypted form and authorizes access to the content through the first set of cryptographic keys in a first security domain; and authorizing a client of the second conditional access server to present the content in accordance with authorization the second conditional access server received from the first conditional access server;

wherein the second conditional access server uses a second set of cryptographic keys to protect the content from unauthorized access in presenting the content in a second security domain; and wherein the first conditional access server authenticates the second conditional access server as one of clients of the first conditional access server through a first authentication process using a first root of trust and the second conditional access server authenticates clients of the second conditional access server through a second authentication process which is independent of the first authentication process and wherein the second authentication process uses a second root of trust which is independent of and different than the first root of trust, and wherein the second conditional access server is configured to substitute the first security domain with the second security domain for the client devices under the second root of trust.

11. The medium of claim 10, wherein the method further comprises:

recording a representation of the content in an encrypted form in response to a message from the first conditional access server.

12. The medium of claim 11, wherein the client sends a request, through a network connection to the second conditional access server, for authorization to present the content after the first conditional access server provides at least a portion of the content which is recorded; and the second conditional access server obtains authorization from the first conditional access server, after the first conditional access server provides the portion of the content, for said authorizing.

13. The medium of claim 10, wherein the method further comprises:

translating authorization to access the content from authorization received from the first conditional access server to authorization for the client.

14. The medium of claim 13, wherein the second set of cryptographic keys comprises a key of a digital rights management system; and the client comprises a digital rights management client.

15. The medium of claim 14, wherein the second conditional access server authorizes the client to use the content through the digital rights management system in accordance with authorization received from the first conditional access server.

16. The medium of claim 15, wherein the first conditional access server provides authorization to the second conditional access server according to an identity of the second conditional access server; the second conditional access server provides authorization to the client according to an identity of the client; and the first conditional access server is not aware of an identity of the client.

17. The medium of claim 10, wherein the second set of cryptographic keys consists one key.

18. The medium of claim 10, wherein the second conditional access server is a server of a further secondary conditional access server and acts as a primary conditional access server with respect to the further secondary conditional access server.

19. A secondary conditional access server to control a presentation of content, the secondary conditional access server comprising:

a communication interface, the communication interface to receive a first set of cryptographic keys from a primary conditional access server which provides a representation of content in an encrypted form and authorizes access to the content through the first set of cryptographic keys in a first security domain; and a controller coupled to the communication interface, the controller to authorize a client of the secondary conditional access server to present the content in accordance with authorization the secondary conditional access server received from the primary conditional access server;

wherein the secondary conditional access server uses a second set of cryptographic keys to protect the content from unauthorized access in presenting the content in a second security domain, and wherein the primary conditional access server authenticates the second conditional access server as one of clients of the primary conditional access server through a first authentication process using a first root of trust and the secondary conditional access server authenticates clients of the secondary conditional access server through a second authentication process which is independent of the first authentication process and wherein the second authentication process uses a second root of trust which is independent of and different than the first root of trust, and wherein the second conditional access server is configured to substitue the first security domain with the second security domain for the client devices under the second root of trust.

20. The secondary conditional access server of claim 19, wherein the controller is to translate authorization to access the content from authorization received from the primary conditional access server to authorization for the client.

21. The secondary conditional access server of claim 20, wherein the second set of cryptographic keys comprises a key of a digital rights management system; the client comprises a digital rights management client; and the secondary conditional access server authorizes the client to use the content through the digital rights management system in accordance with authorization received from the primary conditional access server.

22. The secondary conditional access server of claim 20, wherein the primary conditional access server provides authorization to the secondary conditional access server according to an identity of the secondary conditional access server; the secondary conditional access server provides authorization to the client according to an identity of the client; and the primary conditional access server is not aware of an identity of the client.

23. A secondary conditional access server to control a presentation of content, the secondary conditional access server comprising:

means for receiving a first set of cryptographic keys from a primary conditional access server which provides a representation of content in an encrypted form and authorizes access to the content through the first set of cryptographic keys in a first security domain; and means for authorizing a client of the secondary conditional access server to present the content in accordance with authorization the secondary conditional access server received from the primary conditional access server;

wherein the secondary conditional access server uses a second set of cryptographic keys to protect the content from unauthorized access in presenting the content in a second security domain, and wherein the primary conditional access server authenticates the second conditional access server as one of clients of the primary conditional access server through a first authentication process using a first root of trust and the secondary conditional access server authenticates clients of the secondary conditional access server through a second authentication process which is independent of the first authentication process and wherein the second authentication process uses a second root of trust which is independent of and different than the first root of trust, and wherein the second conditional access server is configured to substitute the first security domain with the second security domain for the client devices under the second root of trust.

24. The secondary conditional access server of claim 23, further comprising:

means for recording a representation of the content in an encrypted form in response to a message from the primary conditional access server, wherein the client sends a request, through a network connection to the secondary conditional access server, for authorization to present the content after the primary conditional access server provides at least a portion of the content which is recorded; and the secondary conditional access server obtains authorization from the primary conditional access server, after the primary conditional access server provides the portion of the content, for authorizing the client to present the content.

25. The secondary conditional access server of claim 23, further comprising:

means for translating authorization to access the content from authorization received from the primary conditional access server to authorization for the client, wherein the second set of cryptographic keys comprises a key of a digital rights management system; and the client comprises a digital rights management client; and wherein the secondary conditional access server authorizes the client to use the content through the digital rights management system in accordance with authorization received from the primary conditional access server.

26. The secondary conditional access server of claim 23, wherein the primary conditional access server provides authorization to the secondary conditional access server according to an identity of the secondary conditional access server; the secondary conditional access server provides authorization to the client according to an identity of the client; and the primary conditional access server is not aware of an identity of the client.

27. The secondary conditional access server of claim 23, wherein the second set of cryptographic keys consists one key.

28. A method to provide conditional access, the method comprising:

broadcasting a first entitlement management message for a subscriber to request caching of a media component;

broadcasting the media component from a first conditional access server in a first security domain;

receiving a client request to use the media component from a client of a second conditional access server in a second security domain after said broadcasting; and responding to the client request from the client of the second conditional access server, wherein the first conditional access server authenticates the second conditional access server as one of clients of the first conditional access server through a first authentication process using a first root of trust and the second conditional access server authenticates clients of the second conditional access server through a second authentication process which is independent of the first authentication process and wherein the second authentication process uses a second root of trust which is independent of and different than the first root of trust, and wherein the second conditional access server is configured to substitute the first security domain with the second security domain for the clients under the second root of trust.

29. The method of claim 28, further comprising:
broadcasting a second entitlement management message to authorize the client to playback the media component responsive to the client request.

30. The method of claim 29, wherein the client is not authorized to use the portion of the media content before the second entitlement management message.

31. The method of claim 30, wherein the second entitlement management message contains data specifying rights of the client to use the portion of the media content on a plurality of devices that are capable of using the portion of the media content simultaneously.

32. A method to process conditional access protection, the method comprising:
receiving, at a conditional access server, security messages of a primary security system in a first security domain;
processing the security messages on the conditional access server; and
transmitting, from the conditional access server to a secondary conditional access client through a network connection in a second security domain, access controlled data that is in an access controlled format and that is at least partially derived from the security messages,
wherein the primary security system authenticates the conditional access server as one of clients of the primary security system through a first authentication process using a first root of trust and the conditional access server authenticates clients of the conditional access server through a second authentication process which is independent of the first authentication process and wherein the second authentication process uses a second root of trust which is independent of and different than the first root of trust, and wherein the conditional access server is configured to substitute the first security domain with the second security domain for the clients under the second root of trust.

33. The method of claim 32, wherein the security messages comprise entitlement management messages; the conditional access server has a user key representing a subscriber of the primary security system; and said processing the entitlement management messages comprises:
decrypting to obtain a service key of the primary security system.

34. The method of claim 32, wherein the access controlled data is protected using a digital rights management system.

35. The method of claim 34, wherein rights to the access controlled data are at least partially derived from the entitlement management messages.

36. The method of claim 34, further comprising:
receiving, at the conditional access server, an entitlement control message of the primary security system; and
processing the entitlement control message on the conditional access server to obtain a control word of the primary security system;
wherein the access controlled data comprises the control word.

37. The method of claim 36, wherein the access controlled data comprises a decrypted version of the entitlement control message.

38. The method of claim 34, further comprising:
receiving, at the conditional access server, an entitlement control message and scrambled content of the primary security system; and
descrambling the scrambled content according to the entitlement control message;
wherein the access controlled data comprises a result of descrambling the scrambled content.

39. The method of claim 38, further comprising:
storing, at the conditional access server, the content in an encrypted form;
wherein the access controlled data is provided in response to a request from the secondary conditional access client.

40. The method of claim 32, further comprising:
receiving, at the conditional access server, an entitlement control message of the primary security system; and
processing the entitlement control message on the conditional access server to generate a substitutive entitlement control message as a replacement of the entitlement control message;
wherein the access controlled data comprises the substitutive entitlement control message.

41. The method of claim 40, wherein the substitutive entitlement control message has a control word encrypted using a key of the conditional access server.

42. The method of claim 41, wherein the substitutive entitlement control message is to be decrypted using a user key of the conditional access server for the primary security system.

43. The method of claim 41, wherein the entitlement control message and the substitutive entitlement control message have a same control word.

44. The method of claim 41, wherein the entitlement control message has a first control word; the substitutive entitlement control message has a second control word; and the first and second control words are different.

45. The method of claim 44, wherein the access controlled data further comprises the first and second control words.

46. The method of claim 32, further comprising:
receiving, at the conditional access server, a first entitlement control message containing a first control word and content scrambled by the first control word;
generating a second entitlement control message containing a second control word that is different from the first control word; and
descrambling the content using the first control word and rescrambling the content by the second control word;
wherein the access controlled data comprises the content rescrambled by the second control word and second entitlement control message.

47. The method of claim 46, further comprising:
storing, at the conditional access server, the content rescrambled by the second control word; and
retrieving the content rescrambled by the second control word in response to a request from the secondary conditional access client.

48. A method to process media content provided by a primary security system, the method comprising:
receiving, at a secondary conditional access client from a conditional access server through a network connection, access controlled data that is in an access controlled format and that is at least partially derived from a security message of the primary security system in a first security domain, the secondary conditional access client being in a second security domain, wherein the primary security system authenticates the conditional access server as one of clients of the primary security system through a first authentication process using a first root of trust and the conditional access server authenticates clients of the conditional access server through a second authentication process which is independent of the first authentication process and wherein the second authentication process uses a second root of trust which is independent of and different than the first root of trust, and wherein the conditional access server is configured to substitute the first security domain with the second security domain for the clients under the second root of trust.

49. The method of claim 48, wherein the security message is an entitlement message; and wherein the secondary conditional access client does not have a user key representing a subscriber of the primary security system.

50. The method of claim 48, wherein the access controlled format protects access to data using a digital rights management system.

51. The method of claim 50, further comprising:
automatically determining whether or not to descramble a portion of media content received from the primary security system for recording according to the entitlement data;
descrambling and recording the portion of the media content in response to a determination to descramble; and
recording the portion of the media content without descrambling in response to a determination not to descramble.

52. The method of claim 50, further comprising:
sending, from the secondary conditional access client to the conditional access server through a network connection, an entitlement control message, the entitlement control message containing a control word in an encrypted form;
wherein the access controlled data comprises the control word.

53. The method of claim 52, further comprising:
descrambling media content using the control word; and
storing the media content in a storage under protection of a digital rights management system.

54. The method of claim 52, further comprising:
descrambling media content using the control word; and
rendering the media content for presentation.

55. The method of claim 54, further comprising:
retrieving the entitlement control message from a storage device;
wherein the entitlement control message is controlled by a first entitlement management message for a first time period, which is earlier than a second entitlement management message for a second time period including a time between when the entitlement control message is sent from the secondary conditional access client to the conditional server and when the access controlled data is received at the secondary conditional access client.

56. The method of claim 52, wherein the access controlled data comprises a decrypted version of the entitlement control message.

57. The method of claim 50, wherein the access controlled data comprises a result of descrambling media content scrambled by a conditional access system of the primary security system.

58. The method of claim 48, further comprising:
receiving a first entitlement control message for descrambling a portion of media content received from the primary security system; and sending the first entitlement control message from the secondary conditional access client to the conditional access server through a network connection.

59. The method of claim 58, wherein the access controlled data comprises a second entitlement control message as a replacement of the entitlement control message; and the method further comprises:
storing the second entitlement control message with the portion of the media content.

60. The method of claim 59, wherein both the first and the second entitlement control messages contain a same control word; the second entitlement control message is encrypted to be decrypted using a key of the conditional access server.

61. The method of claim 59, wherein the first entitlement control message contains a first control word; the second entitlement control message contains a second control word; the first and second control words are different; the access controlled data further comprises the first and second control words; and the method further comprises:
descrambling the content using the first control word and rescrambling the content using the second control word.

62. A non-transitory machine readable medium containing executable computer program instructions which when executed by a data processing system cause said system to perform a method to provide conditional access, the method comprising:
broadcasting a first entitlement management message for a subscriber to request caching of a media component;
broadcasting the media component from a first conditional access server in a first security domain;
receiving a client request to use the media component from a client of a second conditional access server in a second security domain after said broadcasting; and
responding to the client request from the client of the second conditional access server,
wherein the first conditional access server authenticates the second conditional access server as one of clients of the first conditional access server through a first authentication process using a first root of trust and the second conditional access server authenticates clients of the second conditional access server through a second authentication process which is independent of the first authentication process and wherein the second authentication process uses a second root of trust which is independent of and different than the first root of trust, and wherein the second conditional access server is configured to substitute the first security domain with the second security domain for the clients under the second root of trust.

63. The medium of claim 62, wherein the method further comprises:
broadcasting a second entitlement management message to authorize the client to playback the media component responsive to the client request.

64. The medium of claim 63, wherein the client is not authorized to use the portion of the media content before the second entitlement management message.

65. The medium of claim 64, wherein the second entitlement management message contains data specifying rights of the client to use the portion of the media content on a plurality of devices that are capable of using the portion of the media content simultaneously.

66. A non-transitory machine readable medium containing executable computer program instructions which when executed by a data processing system cause said system to perform a method to process conditional access protection, the method comprising:
- receiving, at a conditional access server, security messages of a primary security system in a first security domain;
- processing the security messages on the conditional access server; and
- transmitting, from the conditional access server to a secondary conditional access client through a network connection in a second security domain, access controlled data that is in an access controlled format and that is at least partially derived from the security messages,
- wherein the primary security system authenticates the conditional access server as one of clients of the primary security system through a first authentication process using a first root of trust and the conditional access server authenticates clients of the conditional access server through a second authentication process which is independent of the first authentication process and wherein the second authentication process uses a second root of trust which is independent of and different than the first root of trust, and wherein the conditional access server is configured to substitute the first security domain with the second security domain for the clients under the second root of trust.

67. The medium of claim 66, wherein the security messages comprise entitlement management messages; the conditional access server has a user key representing a subscriber of the primary security system; and said processing the entitlement management messages comprises:
- decrypting to obtain a service key of the primary security system.

68. The medium of claim 66, wherein the access controlled data is protected using a digital rights management system.

69. The medium of claim 68, wherein rights to the access controlled data are at least partially derived from the entitlement management messages.

70. The medium of claim 68, wherein the method further comprises:
- receiving, at the conditional access server, an entitlement control message of the primary security system; and
- processing the entitlement control message on the conditional access server to obtain a control word of the primary security system;
- wherein the access controlled data comprises the control word.

71. The medium of claim 70, wherein the access controlled data comprises a decrypted version of the entitlement control message.

72. The medium of claim 68, wherein the method further comprises:
- receiving, at the conditional access server, an entitlement control message and scrambled content of the primary security system; and
- descrambling the scrambled content according to the entitlement control message;
- wherein the access controlled data comprises a result of descrambling the scrambled content.

73. The medium of claim 72, wherein the method further comprises:
- storing, at the conditional access server, the content in an encrypted form;
- wherein the access controlled data is provided in response to a request from the secondary conditional access client.

74. The medium of claim 66, wherein the method further comprises:
- receiving, at the conditional access server, an entitlement control message of the primary security system; and
- processing the entitlement control message on the conditional access server to generate a substitutive entitlement control message as a replacement of the entitlement control message;
- wherein the access controlled data comprises the substitutive entitlement control message.

75. The medium of claim 74, wherein the substitutive entitlement control message has a control word encrypted using a key of the conditional access server.

76. The medium of claim 75, wherein the substitutive entitlement control message is to be decrypted using a user key of the conditional access server for the primary security system.

77. The medium of claim 75, wherein the entitlement control message and the substitutive entitlement control message have a same control word.

78. The medium of claim 75, wherein the entitlement control message has a first control word; the substitutive entitlement control message has a second control word; and the first and second control words are different.

79. The medium of claim 78, wherein the access controlled data further comprises the first and second control words.

80. The medium of claim 66, wherein the method further comprises:
- receiving, at the conditional access server, a first entitlement control message containing a first control word and content scrambled by the first control word;
- generating a second entitlement control message containing a second control word that is different from the first control word; and
- descrambling the content using the first control word and rescrambling the content by the second control word;
- wherein the access controlled data comprises the content rescrambled by the second control word and second entitlement control message.

81. The medium of claim 80, wherein the method further comprises:
- storing, at the conditional access server, the content rescrambled by the second control word; and
- retrieving the content rescrambled by the second control word in response to a request from the secondary conditional access client.

82. A non-transitory machine readable medium containing executable computer program instructions which when executed by a data processing system cause said system to perform a method to process media content provided by a primary security system, the method comprising:
- receiving, at a secondary conditional access client from a conditional access server through a network connection, access controlled data that is in an access controlled format and that is at least partially derived from a security message of the primary security system in a first security domain, the secondary conditional access client being in a second security domain,
- wherein the primary security system authenticates the conditional access server as one of clients of the primary security system through a first authentication process using a first root of trust and the conditional access server authenticates clients of the conditional access server through a second authentication process which is independent of the first authentication process and wherein the second authentication process uses a second root of trust which is independent of and different than the first root of trust, and wherein the conditional access server is configured substitute the first security domain with the second security domain for the clients under the second root of trust.

83. The medium of claim 82, wherein the security message is an entitlement management message; and wherein the secondary conditional access client does not have a user key representing a subscriber of the primary security system.

84. The medium of claim 82, wherein the access controlled format protects access to data using a digital rights management system.

85. The medium of claim 84, wherein the method further comprises:
automatically determining whether or not to descramble a portion of media content received from the primary security system for recording according to the entitlement data;
descrambling and recording the portion of the media content in response to a determination to descramble; and
recording the portion of the media content without descrambling in response to a determination not to descramble.

86. The medium of claim 84, wherein the method further comprises:
sending, from the secondary conditional access client to the conditional access server through a network connection, an entitlement control message, the entitlement control message containing a control word in an encrypted form;
wherein the access controlled data comprises the control word.

87. The medium of claim 86, wherein the method further comprises:
descrambling media content using the control word; and
storing the media content in a storage under protection of a digital rights management system.

88. The medium of claim 86, wherein the method further comprises:
descrambling media content using the control word; and
rendering the media content for presentation.

89. The medium of claim 88, wherein the method further comprises:
retrieving the entitlement control message from a storage device;
wherein the entitlement control message is controlled by a first entitlement management message for a first time period, which is earlier than a second entitlement management message for a second time period including a time between when the entitlement control message is sent from the secondary conditional access client to the conditional server and when the access controlled data is received at the secondary conditional access client.

90. The medium of claim 86, wherein the access controlled data comprises a decrypted version of the entitlement control message.

91. The medium of claim 84, wherein the access controlled data comprises a result of descrambling media content scrambled by a conditional access system of the primary security system.

92. The medium of claim 82, wherein the method further comprises:
receiving a first entitlement control message for descrambling a portion of media content received from the primary security system; and
sending the first entitlement control message from the secondary conditional access client to the conditional access server through a network connection.

93. The medium of claim 92, wherein the access controlled data comprises a second entitlement control message as a replacement of the entitlement control message; and the method further comprises:
storing the second entitlement control message with the portion of the media content.

94. The medium of claim 93, wherein both the first and the second entitlement control messages contain a same control word; the second entitlement control message is encrypted to be decrypted using a key of the conditional access server.

95. The medium of claim 93, wherein the first entitlement control message contains a first control word; the second entitlement control message contains a second control word; the first and second control words are different; the access controlled data further comprises the first and second control words; and the method further comprises:
descrambling the content using the first control word and rescrambling the content using the second control word.

96. A primary security system to provide conditional access, the system comprising:
means for broadcasting a first entitlement management message for a subscriber to request caching of a media component;
means for broadcasting the media component, the primary security system being in a first security domain;
means for receiving a client request to use the media component from a client of a secondary conditional access server in a second security domain after said broadcasting; and
means for responding to the client request from the client of the secondary conditional access server,
wherein the primary security system authenticates the secondary conditional access server as one of clients of the primary security system through a first authentication process using a first root of trust and the secondary conditional access server authenticates clients of the secondary conditional access server through a second authentication process which is independent of the first authentication process and wherein the second authentication process uses a second root of trust which is independent of and different than the first root of trust, and wherein the second conditional access server is configured to substitute the first security domain with the second security domain for the clients under the second root of trust.

97. The system of claim 96, further comprising:
means for broadcasting a second entitlement management message to authorize the client to playback the media component responsive to the client request.

98. The system of claim 97, wherein the client is not authorized to use the portion of the media content before the second entitlement management message.

99. The system of claim 98, wherein the second entitlement management message contains data specifying rights of the client to use the portion of the media content on a plurality of devices that are capable of using the portion of the media content simultaneously.

100. A data processing system to process conditional access protection, the data processing system comprising:
means for receiving, at a conditional access server, security messages of a primary security system in a first security domain;
means for processing the security messages on the conditional access server; and
means for transmitting, from the conditional access server to a secondary conditional access client through a network connection in a second security domain, access controlled data that is in an access controlled format and that is at least partially derived from the security messages, wherein the primary security system authenticates the conditional access server as one of clients of the primary security system through a first authentication process using a first root of trust and the conditional access server authenticates clients of the conditional access server through a second authentication process which is independent of the first authentication process and wherein the second authentication process uses a second root of trust which is independent of and different than the first root of trust, and wherein the conditional access server is configured substitute the first security domain with the second security domain for the clients under the second root of trust.

101. The data processing system of claim 100, wherein the security messages comprise entitlement management messages; the conditional access server has a user key representing a subscriber of the primary security system; and said means for processing the entitlement management messages comprises:

means for decrypting to obtain a service key of the primary security system.

102. The data processing system of claim 100, wherein the access controlled data is protected using a digital rights management system.

103. The data processing system of claim 102, wherein rights to the access controlled data are at least partially derived from the entitlement management messages.

104. The data processing system of claim 102, further comprising:

means for receiving, at the conditional access server, an entitlement control message of the primary security system; and means for processing the entitlement control message on the conditional access server to obtain a control word of the primary security system;

wherein the access controlled data comprises the control word.

105. The data processing system of claim 104, wherein the access controlled data comprises a decrypted version of the entitlement control message.

106. The data processing system of claim 102, further comprising:

means for receiving, at the conditional access server, an entitlement control message and scrambled content of the primary security system; and means for descrambling the scrambled content according to the entitlement control message;

wherein the access controlled data comprises a result of descrambling the scrambled content.

107. The data processing system of claim 106, further comprising:

means for storing, at the conditional access server, the content in an encrypted form;

wherein the access controlled data is provided in response to a request from the secondary conditional access client.

108. The data processing system of claim 100, further comprising:

means for receiving, at the conditional access server, an entitlement control message of the primary security system; and means for processing the entitlement control message on the conditional access server to generate a substitutive entitlement control message as a replacement of the entitlement control message;

wherein the access controlled data comprises the substitutive entitlement control message.

109. The data processing system of claim 108, wherein the substitutive entitlement control message has a control word encrypted using a key of the conditional access server.

110. The data processing system of claim 109, wherein the substitutive entitlement control message is to be decrypted using a user key of the conditional access server for the primary security system.

111. The data processing system of claim 109, wherein the entitlement control message and the substitutive entitlement control message have a same control word.

112. The data processing system of claim 109, wherein the entitlement control message has a first control word; the substitutive entitlement control message has a second control word; and the first and second control words are different.

113. The data processing system of claim 112, wherein the access controlled data further comprises the first and second control words.

114. The data processing system of claim 100, further comprising:

means for receiving, at the conditional access server, a first entitlement control message containing a first control word and content scrambled by the first control word;

means for generating a second entitlement control message containing a second control word that is different from the first control word; and means for descrambling the content using the first control word and rescrambling the content by the second control word;

wherein the access controlled data comprises the content rescrambled by the second control word and second entitlement control message.

115. The data processing system of claim 114, further comprising:

means for storing, at the conditional access server, the content rescrambled by the second control word; and means for retrieving the content rescrambled by the second control word in response to a request from the secondary conditional access client.

116. A data processing system to process media content provided by a primary security system, the data processing system comprising:

means for receiving, at a secondary conditional access client from a conditional access server through a network connection, access controlled data that is in an access controlled format and that is at least partially derived from a security message of the primary security system in a first security domain, the secondary conditional access client being in a second security domain, wherein the primary security system authenticates the conditional access server clients of the primary security system through a first authentication process using a first root of trust and the conditional access server authenticates clients of the conditional access server through a second authentication process which is independent of the first authentication process and wherein the second authentication process uses a second root of trust which is independent of and different than the first root of trust, and wherein the conditional access server is configured to substitute the first security domain with the second security domain for the clients under the second root of trust.

117. The data processing system of claim 116, wherein the security message is an entitlement management message; and wherein the secondary conditional access client does not have a user key representing a subscriber of the primary security system.

118. The data processing system of claim 116, wherein the access controlled format protects access to data using a digital rights management system.

119. The data processing system of claim 118, further comprising:
    means for automatically determining whether or not to descramble a portion of media content received from the primary security system for recording according to the entitlement data;
    means for descrambling and recording the portion of the media content in response to a determination to descramble; and
    means for recording the portion of the media content without descrambling in response to a determination not to descramble.

120. The data processing system of claim 118, further comprising:
    means for sending, from the secondary conditional access client to the conditional access server through a network connection, an entitlement control message, the entitlement control message containing a control word in an encrypted form;
    wherein the access controlled data comprises the control word.

121. The data processing system of claim 120, further comprising:
    means for descrambling media content using the control word; and
    means for storing the media content in a storage under protection of a digital rights management system.

122. The data processing system of claim 120, further comprising:
    means for descrambling media content using the control word; and
    means for rendering the media content for presentation.

123. The data processing system of claim 122, further comprising:
    means for retrieving the entitlement control message from a storage device;
    wherein the entitlement control message is controlled by a first entitlement management message for a first time period, which is earlier than a second entitlement management message for a second time period including a time between when the entitlement control message is sent from the secondary conditional access client to the conditional server and when the access controlled data is received at the secondary conditional access client.

124. The data processing system of claim 120, wherein the access controlled data comprises a decrypted version of the entitlement control message.

125. The data processing system of claim 118, wherein the access controlled data comprises a result of descrambling media content scrambled by a conditional access system of the primary security system.

126. The data processing system of claim 116, further comprising:
    means for receiving a first entitlement control message for descrambling a portion of media content received from the primary security system; and
    means for sending the first entitlement control message from the secondary conditional access client to the conditional access server through a network connection.

127. The data processing system of claim 126, wherein the access controlled data comprises a second entitlement control message as a replacement of the entitlement control message; and the system further comprises:
    means for storing the second entitlement control message with the portion of the media content.

128. The data processing system of claim 127, wherein both the first and the second entitlement control messages contain a same control word; the second entitlement control message is encrypted to be decrypted using a key of the conditional access server.

129. The data processing system of claim 127, wherein the first entitlement control message contains a first control word; the second entitlement control message contains a second control word; the first and second control words are different; the access controlled data further comprises the first and second control words; and the system further comprises:
    means for descrambling the content using the first control word and rescrambling the content using the second control word.

130. A conditional access server, comprising:
    one or more communication interfaces, the one or more communication interfaces to receive security messages of a primary security system in a first security domain;
    a processor coupled to the one or more communication interfaces, the processor to process the security messages, and the one or more communication interfaces to transmit, to a secondary conditional access client through a network connection in a second security domain, access controlled data that is in an access controlled format and that is at least partially derived from the security messages,
    wherein the primary security system authenticates the conditional access server clients of the primary security system through a first authentication process using a first root of trust and the conditional access server authenticates clients of the conditional access server through a second authentication process which is independent of the first authentication process and wherein the second authentication process uses a second root of trust which is independent of and different than the first root of trust, and wherein the conditional access server is configured to substitute the first security domain with the second security domain for the clients under the second root of trust.

131. The conditional access server of claim 130, wherein the security messages comprise entitlement management messages; and the access controlled data is protected using a digital rights management system.

132. The conditional access server of claim 131, wherein rights to the access controlled data are at least partially derived from the entitlement management messages.

133. The conditional access server of claim 131, wherein the one or more communication interfaces are to receive an entitlement control message of the primary security system; the processor is to obtain a control word of the primary security system from the entitlement control message; and the access controlled data comprises the control word.

134. The conditional access server of claim 131, wherein the one or more communication interfaces are to receive an entitlement control message and scrambled content of the primary security system; and the conditional access server further comprises:
    a descrambler coupled to the processor, the descrambler to descramble the scrambled content according to the entitlement control message;
    wherein the access controlled data comprises a result of descrambling the scrambled content.

135. The conditional access server of claim 134, further comprising:

a storage device coupled to one or more communication interfaces, the storage device to store the content in an encrypted form;

wherein the access controlled data is provided in response to a request from the secondary conditional access client.

136. The conditional access server of claim 130, wherein the one or more communication interfaces are to receive entitlement control message of the primary security system; the processor is to generate a substitutive entitlement control message as a replacement of the entitlement control message; and the access controlled data comprises the substitutive entitlement control message.

137. The conditional access server of claim 136, wherein the substitutive entitlement control message has a control word encrypted using a key of the conditional access server.

138. The conditional access server of claim 130, wherein the one or more communication interfaces are to receive a first entitlement control message containing a first control word and content scrambled by the first control word; the processor is to generate a second entitlement control message containing a second control word that is different from the first control word; and the conditional access server further comprises:

a transcrambler coupled to the one or more communication interfaces and the processor, the transcrambler to descramble the content using the first control word and rescramble the content using the second control word;

wherein the access controlled data comprises the content rescrambled by the second control word and second entitlement control message.

139. The conditional access server of claim 138, further comprising:

a storage device coupled to the transcrambler, the storage device to store the content rescrambled by the second control word.

140. A secondary conditional access client, comprising:

a communication interface to receive, from a conditional access server through a network connection, access controlled data that is in an access controlled format and that is at least partially derived from a security message of a primary security system in a first security domain, the secondary conditional access client being in a second security domain; and a processor coupled to the communication interface, the processor to process the access controlled data, wherein the primary security system authenticates the conditional access server as one of clients of the primary security system through a first authentication process using a first root of trust and the conditional access server authenticates clients of the conditional access server through a second authentication process which is independent of the first authentication process and wherein the second authentication process uses a second root of trust which is independent of and different than the first root of trust, and wherein the conditional access server is configured to substitute the first security domain with the second security domain for the clients under the second root of trust.

141. The client of claim 140, wherein the security message is an entitlement management message; and wherein the secondary conditional access client does not have a user key representing a subscriber of the primary security system.

142. The client of claim 140, wherein the access controlled format protects access to data using a digital rights management system.

143. The client of claim 142, wherein the processor is to automatically determine whether or not to descramble a portion of media content received from the primary security system for recording according to the entitlement data; the client further comprises:

a storage device;

a descrambler coupled to the processor and the storage device, in response to a determination to descramble the descrambler to descramble the portion of the media content for storing in the storage device, in response to a determination not to descramble the storage device to record the portion of the media content without descrambling.

144. The client of claim 142, wherein the communication interface is to send, to the conditional access server through a network connection, an entitlement control message containing a control word in an encrypted form; and the access controlled data comprises the control word.

145. The client of claim 144, further comprising:

a storage device;

a descrambler coupled to the processor and the storage device, the descrambler to descramble media content using the control word, the storage device to store the media content under protection of a digital rights management system.

146. The client of claim 140, further comprising:

a physical interface to receive a first entitlement control message for descrambling a portion of media content received from the primary security system; and wherein the communication interface is to send the first entitlement control message to the conditional access server through a network connection.

* * * * *